(12) United States Patent
Horn et al.

(10) Patent No.: US 9,386,607 B2
(45) Date of Patent: Jul. 5, 2016

(54) METHOD AND APPARATUS FOR MANAGING PACKET DATA NETWORK CONNECTIVITY

(75) Inventors: Gavin Bernard Horn, San Diego, CA (US); Miguel Griot, San Diego, CA (US); Ramachandran Subramanian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1129 days.

(21) Appl. No.: 13/161,416

(22) Filed: Jun. 15, 2011

(65) Prior Publication Data

US 2011/0310799 A1    Dec. 22, 2011

Related U.S. Application Data

(60) Provisional application No. 61/355,918, filed on Jun. 17, 2010, provisional application No. 61/435,389, filed on Jan. 24, 2011.

(51) Int. Cl.
*H04W 76/02* (2009.01)
*H04W 8/08* (2009.01)
*H04W 48/08* (2009.01)

(52) U.S. Cl.
CPC .............. *H04W 76/02* (2013.01); *H04W 8/082* (2013.01); *H04W 48/08* (2013.01)

(58) Field of Classification Search
None
See application file for complete search history.

(56) References Cited

U.S. PATENT DOCUMENTS

2005/0060361 A1* 3/2005 Chatrath et al. .............. 709/200
2005/0083899 A1  4/2005 Babbar et al.
2008/0285492 A1* 11/2008 Vesterinen .................... 370/310
2010/0061386 A1  3/2010 Olsson et al.
2010/0195493 A1* 8/2010 Hedman et al. ............... 370/230

(Continued)

FOREIGN PATENT DOCUMENTS

CN      101720119 A    6/2010
JP      2009253431 A   10/2009

(Continued)

OTHER PUBLICATIONS

"3GPP 23.829 V1.1.0 (May 2005)—Local IP Access and Selected IP Traffic Offload (Release 10)", May 28, 2010, XP55007603, Retrieved from the Internet: URL:www.3gpp.org [retrieved on Sep. 20, 2011].

(Continued)

*Primary Examiner* — Ayaz Sheikh
*Assistant Examiner* — Peter Chau
(74) *Attorney, Agent, or Firm* — François A. Pelaez

(57) ABSTRACT

Methods and apparatuses are provided for managing packet data network (PDN) connectivity for a device. PDN connectivity to a local gateway can be managed at an access point with which the device is communicating based at least in part on received PDN connectivity parameters. The PDN connectivity parameters can include access points, related closed subscriber groups, public land mobile networks, etc., from which a device can request a PDN connection. The PDN connectivity parameters can be specific for the device and/or for one or more access point names. In addition, a subscription server or other core network device can communicate the PDN connectivity parameters to the device and/or the device can receive PDN connectivity parameters as a result of a failed PDN connection attempt to an access point.

30 Claims, 15 Drawing Sheets

(56) References Cited

U.S. PATENT DOCUMENTS

| | | | |
|---|---|---|---|
| 2010/0211628 A1* | 8/2010 | Shah | 709/203 |
| 2011/0103310 A1* | 5/2011 | Stojanovski et al. | 370/328 |
| 2011/0170517 A1* | 7/2011 | Bakker et al. | 370/331 |
| 2011/0171953 A1* | 7/2011 | Faccin et al. | 455/426.1 |
| 2011/0199987 A1* | 8/2011 | Rommer et al. | 370/329 |
| 2011/0228750 A1* | 9/2011 | Tomici et al. | 370/338 |
| 2012/0039304 A1* | 2/2012 | Kim et al. | 370/332 |
| 2012/0147872 A1* | 6/2012 | Zisimopoulos et al. | 370/338 |
| 2012/0184266 A1* | 7/2012 | Faccin et al. | 455/426.1 |
| 2012/0207129 A1* | 8/2012 | Sun | 370/331 |

FOREIGN PATENT DOCUMENTS

| | | |
|---|---|---|
| JP | 2012510765 A | 5/2012 |
| WO | 2009083429 A1 | 7/2009 |
| WO | 2010039085 A1 | 4/2010 |
| WO | 2010050222 A1 | 5/2010 |
| WO | 2010063348 A1 | 6/2010 |
| WO | 2011085373 A2 | 7/2011 |

OTHER PUBLICATIONS

Alcatel-Lucent et al., "Restructuration of TR 23.829", 3GPP Draft; S2-101719 WAS 1449__23829 Restructuring__R0, 3rd Generation Partnership Project (3GPP), Mobile Competence Centre; 650, Route Des Luci0les; F-06921 Sophia-Antip0lis CEDEX; France, vol. SA WG2, No. San Francisco, USA; 20100222, Feb. 25, 2010, XP050434102 [retrieved on Feb. 25, 2010].

International Search Report and Written Opinion—PCT/US2011/040992—ISA/EPO—Nov. 16, 2011.

LG Electronics: "Considerations in choice of solutions for LIPA Indications to UE", 3GPP Draft; S2-102363, 3rd Generation Partnership Project (3GPP), Mobile Competence Centre ; 650, Route Des Lucioles ; F-06921 Sophia-Antipolis CEDEX ; France, vol. SA WG2, No. Kyoto; 20100510, May 4, 2010, XP050434536, [retrieved on May 4, 2010].

LG Electronics et al: "Call flows for LIPA Solution 1 Variant 1 with collocated H(e)NB and L-GW", 3GPP Draft; S2-102941__WAS2883__WAS2492__LIPA__S0L1__VAR1__Collocated__V3, 3rd Generation Partnership Project (3GPP), Mobile Competence Centre ; 650, Route Des Lucioles ; F-06921 Sophia-Antipolis Cedex ; France, vol. SA WG2, No. Kyoto; 20100510, May 14, 2010, XP050435031, [retrieved on May 14, 2010].

NEC: "Support of operator control for SIPTO/LIPA traffic", 3GPP Draft; S2-095291, No. Kyoto; 20090904, Aug. 25, 2009, XP050396780, Retrieved from the Internet: URL:http://www.3gpp.org/ftp/tsg__sa/WG2__Arc h/TSGS2__75__Kyoto/docs/> [retrieved on Aug. 25, 2009].

Ikeda, S., et al., "A Proposal on Mobility Support for Local IP Access via Femto Base Station," Technical Report of the Institute of Electronics, Information and Communication Engineers, IN2009-204, pp. 1-2, Feb. 25, 2010.

* cited by examiner

METHOD AND APPARATUS FOR MANAGING PACKET DATA NETWORK CONNECTIVITY

CLAIM OF PRIORITY UNDER 35 U.S.C. §119

The present Application for Patent claims priority to Provisional Application No. 61/355,918 entitled "METHOD AND APPARATUS FOR ENFORCING NETWORK SELECTION IN A ROAMING NETWORK" filed Jun. 17, 2010, and assigned to the assignee hereof and hereby expressly incorporated by reference herein, as well as Provisional Application No. 61/435,389 entitled "MANAGEMENT OF LOCAL INTERNET PROTOCOL ACCESS USING A PROVISIONED MEMORY IN A MOBILE ENTITY" filed Jan. 24, 2011, and assigned to the assignee hereof and hereby expressly incorporated by reference herein.

BACKGROUND

1. Field

The following description relates generally to wireless network communications, and more particularly to managing packet data network connectivity.

2. Background

Wireless communication systems are widely deployed to provide various types of communication content such as, for example, voice, data, and so on. Typical wireless communication systems may be multiple-access systems capable of supporting communication with multiple users by sharing available system resources (e.g., bandwidth, transmit power, . . . ). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP long term evolution (LTE), ultra mobile broadband (UMB), evolution data optimized (EV-DO), etc.

Generally, wireless multiple-access communication systems may simultaneously support communication for multiple mobile devices. Each mobile device may communicate with one or more base stations via transmissions on forward and reverse links. The forward link (or downlink) refers to the communication link from base stations to mobile devices, and the reverse link (or uplink) refers to the communication link from mobile devices to base stations. Further, communications between mobile devices and base stations may be established via single-input single-output (SISO) systems, multiple-input single-output (MISO) systems, multiple-input multiple-output (MIMO) systems, and so forth. In addition, mobile devices can communicate with other mobile devices (and/or base stations with other base stations) in peer-to-peer wireless network configurations.

To supplement conventional base stations, additional base stations can be deployed to provide more robust wireless coverage to mobile devices. For example, wireless relay stations and low power base stations (e.g., which can be commonly referred to as Home NodeBs or Home eNBs, collectively referred to as H(e)NB, femto access points, femtocells, picocells, microcells, etc.) can be deployed for incremental capacity growth, richer user experience, in-building or other specific geographic coverage, and/or the like. In some configurations, such low power base stations are connected to the Internet and the mobile operator's network via broadband connection (e.g., digital subscriber line (DSL) router, cable or other modem, etc.). Some H(e)NBs provide closed subscriber group (CSG) access that restricts access to certain devices or related users that are members of the CSG. A home subscriber server (HSS), home location register (HLR), or one or more other nodes of a device's home network can store CSG subscription information for the device (e.g., in addition to general subscription information for the device), which can include one or more lists of CSGs of which the device is a member or can otherwise access.

In addition, by virtue of the broadband connection utilized by H(e)NBs, H(e)NBs can additionally acquire access to services or access to resources over a local network. In an example, where an H(e)NB utilizes (or provides) a gateway or router that can allow other devices to access the Internet or another packet data network (PDN), the devices and the H(e)NB can participate in a local PDN that is served by the gateway or router. In this example, the gateway or router can provide services or access to resources over the local PDN, such as storage devices, printers or other output devices, etc. The H(e)NB, in some examples, can provide local internet protocol (IP) access (LIPA) to one or more mobile devices communicating with the H(e)NB over a mobile network interface such that the one or more mobile devices can access local resources on the PDN as well via the H(e)NB (e.g., and/or devices on the local network can access resources of the one or more mobile devices). In another example, an H(e)NB can implement selected IP traffic offload (SIPTO) for filtering traffic related to one or more devices over the Internet using the router in the PDN without forwarding the traffic through the mobile network.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more embodiments and corresponding disclosure thereof, various aspects are described in connection with managing packet data network (PDN) connectivity, such as local internet protocol (IP) access (LIPA), selected IP traffic offload (SIPTO), etc., for one or more devices. For example, one or more parameters related to PDN connectivity can be provided to a device for determining whether a PDN connection is allowed with one or more access points with which the device is communicating. For example, the one or more parameters can specify a list of access points with an indication of whether PDN connectivity (e.g., in the form of LIPA, SIPTO, etc.) to a gateway is allowed for the device, a list of access points for which certain PDN connectivity is allowed, a list of access point names (APN) related to one or more access points—or a grouping of access points, such as a closed subscriber group (CSG), public land mobile network (PLMN), etc.—and indications of whether PDN connectivity is allowed for the device, a list of APNs for which certain PDN connectivity is allowed at one or more access points, and/or the like.

In addition, for example, the parameters can be specified in device subscription information, CSG information related to the device, and/or the like. In any case, the device can determine whether to request or initiate a PDN connection from an access point based at least in part on the one or more parameters. This can mitigate unnecessary signaling where a device may otherwise request a PDN connection via an access point with which PDN connectivity is not allowed.

According to an example, a method for utilizing PDN connectivity in a wireless network is provided. The method includes receiving one or more parameters specifying whether PDN connectivity to a local gateway is allowed at one or more access points and receiving a request to establish a PDN connection to the local gateway while connected to at least one of the one or more access points. The method further includes determining whether to initiate the PDN connection to the local gateway using the at least one of the one or more access points based at least in part on the one or more parameters.

In another aspect, an apparatus for utilizing PDN connectivity in a wireless network provided. The apparatus includes at least one processor configured to obtain one or more parameters specifying whether PDN connectivity to a local gateway is allowed at one or more access points and receive a request to establish a PDN connection with the local gateway while connected to at least one of the one or more access points. The at least one processor can be further configured to determine whether to initiate the PDN connection to the local gateway using the at least one of the one or more access points based at least in part on the one or more parameters. The apparatus also includes a memory coupled to the at least one processor.

In yet another aspect, an apparatus for utilizing PDN connectivity in a wireless network is provided that includes means for obtaining one or more parameters specifying whether PDN connectivity to a local gateway is allowed at one or more access points and means for receiving a request to establish a PDN connection to the local gateway while connected to at least one of the one or more access points. The apparatus further includes means for determining whether to initiate the PDN connection to the local gateway at the at least one of the one or more access points based at least in part on the one or more parameters.

Still, in another aspect, a computer-program product for utilizing PDN connectivity in a wireless network is provided including a computer-readable medium having code for causing at least one computer to obtain one or more parameters specifying whether PDN connectivity to a local gateway is allowed at one or more access points and code for causing the at least one computer to receive a request to establish a PDN connection to the local gateway while connected to at least one of the one or more access points. The computer-readable medium further includes code for causing the at least one computer to determine whether to initiate the PDN connection to the local gateway using the at least one of the one or more access points based at least in part on the one or more parameters.

Moreover, in an aspect, an apparatus for utilizing PDN connectivity in a wireless network is provided that includes a parameter receiving component for obtaining one or more parameters specifying whether PDN connectivity to a local gateway is allowed at one or more access points and a PDN request determining component for receiving a request to establish a PDN connection to the local gateway while connected to at least one of the one or more access points. The apparatus further includes a PDN connection requesting component for determining whether to initiate the PDN connection to the local gateway at the at least one of the one or more access points based at least in part on the one or more parameters.

According to another example, a method for utilizing PDN connectivity in wireless networks is provided including receiving a request from a device to establish a PDN connection with an access point specifying an APN and determining the APN relates to PDN connectivity to a local gateway. The method further includes determining the device is not allowed to establish the PDN connection at the access point based on determining the APN relates to PDN connectivity to the local gateway and sending one or more PDN connectivity parameters to the device indicating one or more access points with which the device is not able to establish PDN connections to the local gateway for the APN.

In another aspect, an apparatus for utilizing PDN connectivity in a wireless network is provided. The apparatus includes at least one processor configured to receive a request from a device to establish a PDN connection with an access point specifying an access point name (APN) and determine the APN relates to PDN connectivity to a local gateway. The at least one processor can be further configured to determine the device is not allowed to establish the PDN connection at the access point based at least in part on determining the APN relates to PDN connectivity to the local gateway and send one or more PDN connectivity parameters to the device indicating one or more access points with which the device is not able to establish PDN connections to the local gateway for the APN. The apparatus also includes a memory coupled to the at least one processor.

In yet another aspect, an apparatus for utilizing PDN connectivity in a wireless network is provided that includes means for receiving a request from a device to establish a PDN connection with an access point specifying an APN and means for determining the device is not allowed to establish the PDN connection to a local gateway at the access point based at least in part on determining the APN relates to PDN connectivity to the local gateway. The apparatus further includes means for sending one or more PDN connectivity parameters to the device indicating one or more access points with which the device is not able to establish PDN connections to the local gateway for the APN.

Still, in another aspect, a computer-program product for utilizing PDN connectivity in a wireless network is provided including a computer-readable medium having code for causing at least one computer to receive a request from a device to establish a PDN connection with an access point specifying an APN and code for causing the at least one computer to determine the APN relates to PDN connectivity to a local gateway. The computer-readable medium further includes code for causing the at least one computer to determine the device is not allowed to establish the PDN connection at the access point based at least in part on determining the APN relates to PDN connectivity to the local gateway and code for causing the at least one computer to send one or more PDN connectivity parameters to the device indicating one or more access points with which the device is not able to establish PDN connections to the local gateway for the APN.

Moreover, in an aspect, an apparatus for utilizing PDN connectivity in a wireless network is provided that includes a PDN connection request receiving component for receiving a request from a device to establish a PDN connection with an access point specifying an APN and a PDN connectivity determining component for determining the device is not allowed to establish the PDN connection to a local gateway at the access point based at least in part on determining the APN relates to PDN connectivity to the local gateway. The apparatus further includes a PDN connectivity indicating component for sending one or more PDN connectivity parameters to the device indicating one or more access points with which the device is not able to establish PDN connections to the local gateway for the APN.

According to yet another example, a method for establishing a PDN connection is provided herein. The method includes determining to establish a PDN connection to a local gateway while communicating with an access point and selecting an APN that corresponds to PDN connectivity to the local gateway at the access point. The method further includes transmitting a request to establish a PDN connection to the access point specifying the APN.

In another aspect, an apparatus for establishing a PDN connection is provided. The apparatus includes at least one processor configured to determine to establish a PDN connection to a local gateway while communicating with an access point and select an APN that corresponds to PDN connectivity to the local gateway at the access point. The at least one processor can be further configured to transmit a request to establish the PDN connection to the access point specifying the APN. The apparatus also includes a memory coupled to the at least one processor.

In yet another aspect, an apparatus for establishing a PDN connection is provided that includes means for determining to establish a PDN connection to a local gateway while communicating with an access point. The apparatus further includes means for transmitting a request to establish the PDN connection to the access point specifying an APN that corresponds to PDN connectivity to the local gateway at the access point.

Still, in another aspect, a computer-program product for establishing a PDN connection is provided including a computer-readable medium having code for causing at least one computer to determine to establish a PDN connection to a local gateway while communicating with an access point and code for causing the at least one computer to select an APN that corresponds to PDN connectivity to the local gateway at the access point. The computer-readable medium further includes code for causing the at least one computer to transmit a request to establish the PDN connection to the access point specifying the APN.

Moreover, in an aspect, an apparatus for establishing a PDN connection is provided that includes a PDN request determining component for determining to establish a PDN connection to a local gateway while communicating with an access point. The apparatus further includes a PDN connection requesting component for transmitting a request to establish the PDN connection to the access point specifying an APN that corresponds to PDN connectivity to the local gateway at the access point.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
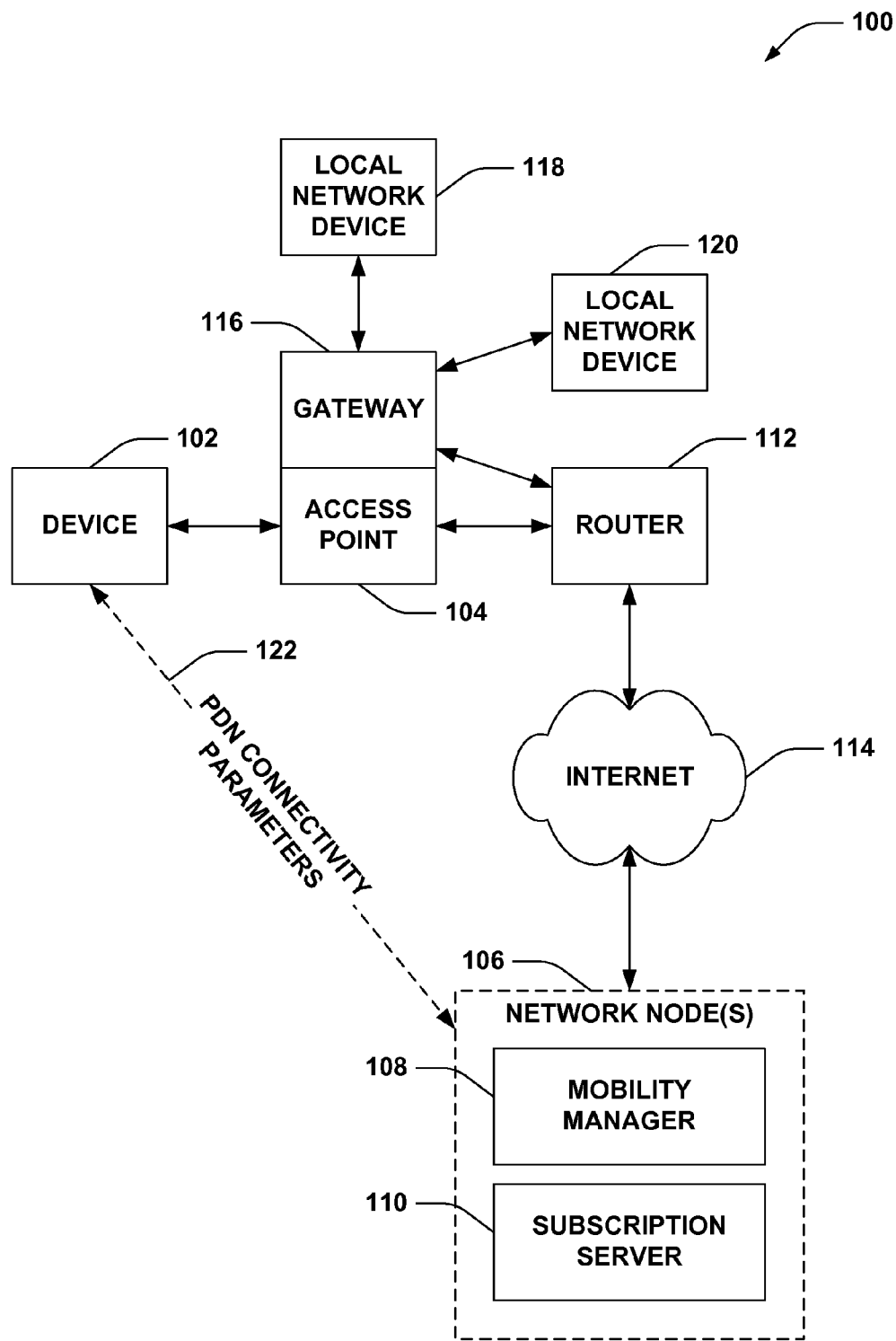
FIG. 1 is a block diagram of an aspect of an example system for communicating packet data network (PDN) connectivity parameters.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

As described further herein, packet data network (PDN) connectivity can be managed for one or more devices. For example, a device can determine whether to request or initiate PDN connectivity with a gateway from an access point based at least in part on one or more parameters received from one or more mobile network components. For example, the one or more parameters can specify whether PDN connectivity is allowed at one or more access points or groups of access points (e.g., a closed subscriber group) for the device, whether one or more access point names (APN) allow PDN connectivity, and/or the like. The device can receive the one or more parameters in subscription information, closed subscriber group (CSG) subscription information, etc., from one or more core mobile network nodes, as part of a rejected PDN connection attempt, and/or the like. Thus, the device can accordingly determine whether to request or initiate a PDN connection using a given access point and/or using a specific APN to prevent unnecessary signaling in situations where a PDN connection from the device would otherwise be rejected.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, evolved Node B (eNB), or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

Referring to FIG. 1, illustrated are several nodes of a sample communication system 100. For illustration purposes, various aspects of the disclosure are described in the context of one or more devices, access points, and network nodes that communicate with one another. It is to be appreciated, however, that aspects herein may be applicable to other types of apparatuses or other similar apparatuses that are referenced using other terminology. For example, access points can be referred to or implemented as base stations, eNodeBs (eNB), Home Node Bs (e.g., in UMTS) or Home eNBs (e.g., in LTE), collectively referred to as H(e)NBs, femtocell or picocell access points, mobile base stations, relay nodes, hot-spots, routers, gateways, etc., while devices may be referred to or implemented as user equipment (UE), mobile devices, access terminals, modems (or other tethered devices), or may be a portion thereof, and so on.

Device 102 can receive one or more services (e.g., network connectivity) from access point 104. Device 102 can be a wired or wireless device installed within and/or traveling throughout a coverage area provided by access point 104 and/or one or more access points of the system 100. For example, at various points in time, device 102 can connect to an access point 104 or some other access point in the system 100 (not shown) over a wired or wireless interface. Each of these access points can communicate with one or more network nodes (represented, for example, by network node(s) 106) to facilitate wide area network connectivity. Network nodes 106 can include one or more radio and/or core network nodes in a mobile network, for example. Thus, in various examples, network nodes 106 can represent functionality such as at least one of: network management (e.g., via an operation, administration, management (OAM), and/or provisioning entity), call control, session management, mobility management, subscription management, gateway functions, interworking functions, or some other suitable network functionality. Network nodes 106 can include a mobility manager 108, which can be a mobility management entity (MME), serving general packet radio services (GPRS) support node (SGSN), mobile switching center (MSC), visitor location register (VLR), etc., a subscription server 110, which can be a home subscriber server (HSS), home location register (HLR), etc., and/or the like, that can be part of a one or more PLMNs accessible by device 102.

In some cases, device 102 can access a restricted group access point (e.g., access point 104) associated with a wireless cell set. In general, a wireless cell set comprises a set of one or more cells (e.g., provided by at least one access point, such as access point 104) having a defined relationship. An example of a wireless cell set is a CSG. For convenience, the discussion that follows may simply refer to the term CSG, rather than the more general term wireless cell set. It should be appreciated, however, that the described concepts may be applicable to other types of defined sets or groups (e.g., restricted groups) of wireless cells or other similar entities. Also, restricted groups can provide a diminished level of access to non-members (which can be referred to as hybrid-mode access, or the cells within the group as hybrid cells), to which aspects described herein can apply as well. In addition, it is to be appreciated that an access point, such as access point 104, can provide one or more cells within which devices can communicate with the access point.

As depicted, access point 104 can be coupled to a router 112 or other device to access Internet 114, and access point 104 can allow device 102 to communicate with network nodes 106 via Internet 114. In another example, access point 104 can connect to Internet 114 using a direct broadband connection (e.g., via a modem). Moreover, for example, access point 104 can be coupled to a gateway 116, which can be a local gateway that allows communication between one or more local network devices 118 and 120, and access point 104, allows access to router 112, etc. Though shown as co-located with access point 104 in the depicted example, it is to be appreciated that gateway 116 can be implemented within access point 104, as a separate entity from access point 104, and/or the like. Moreover, for example, router 112 can be similarly co-located with access point 104 and/or gateway 116, implemented within access point 104, and/or the like. In any case, access point 104 can receive communications from device 102 intended for nodes in a mobile network and can forward the communications to network nodes 106 through router 112 and via Internet 114 to provide mobile network access to device 102. For example, the communications can be associated with one or more communications tunnels, and access point 104 can determine that the packets are intended for one or more of network nodes 106 based on the one or more communications tunnels (e.g., based on one or more parameters, such as a tunnel identifier, destination address, etc., in packet headers).

For example, to facilitate communicating between device 102 and gateway 116, a radio bearer can be established between access point 104 and device 102. For example, a first mobile network bearer between gateway 116 and another component of the mobile network, such as one or more of network node(s) 106, can be established, as well as a second mobile network bearer between access point 104 and the other component of the mobile network (e.g., before, after, and/or as part of establishing the radio bearer). Thus, in one example, communications related to device 102 intended for gateway 116 can traverse the other component of the mobile network (e.g., via router 112 and Internet 114) from access point 104 to arrive at gateway 116.

In addition, in one example, access point 104 may provide PDN connectivity to facilitate at least one of decreasing load on the network nodes 106, providing access to local network resources, and/or the like. For example, the access point 104 may provide local internet protocol (IP) access (LIPA), selected IP traffic offload (SIPTO), etc., to one or more devices for allowing access to local IP components, offloading traffic from the one or more devices to a connection to Internet 114, etc. without traversing network nodes 106. Where access point 104 provides PDN connectivity, for example, device 102 can access router 112, local network device 118 and/or 120, etc. using a local gateway 116 directly without traversing any of network node(s) 106. In this example, device 102 can initiate a PDN connection to access point 104, which can initially be received by mobility manager 108 to ensure device 102 is allowed to initiate the PDN connection. Where device 102 is permitted to initiate PDN connectivity with access point 104, a PDN bearer or other communication tunnel can be established between access point 104 and gateway 116 for allowing device 102 communications with one or more nodes, such as router 112, local network devices 118 and/or 120, etc. In one example, data received over the radio bearer between device 102 and access point 104 can be sent over the PDN bearer between access point 104 and gateway 116, and similarly, communications intended for device 102 can be received from router 112, local network devices 118 and/or 120, etc., and gateway 116 can forward the communications to the device 102 via the PDN bearer with access point 104.

For example, gateway 116 additionally communicates with local network devices 118 and 120 to provide sharing of resources therebetween, access to Internet 114 via router 112, and/or the like. For example, local network devices 118 and 120 can be substantially any device operable to communicate in a network, such as a local area network (LAN) or wireless LAN (WLAN) device (e.g., a computer, server, printer, digital video recorder (DVR), mobile device, a portion thereof, or substantially any device with a processor (or access to a processor) and a network interface, etc.), and/or the like. Moreover, since access point 104 is coupled with gateway 116, for example, access point 104 participates in the local network with local network devices 118 and 120, and can thus access resources or services offered by local network devices 118 and/or 120 in the local network, and/or can allow access to resources related to access point 104 or provide services thereto. In another example, local network devices 118 and 120 can be connected to router 112, which can similarly provide access thereto.

In this regard, gateway 116 can provide PDN connectivity in the form of LIPA where the access point 104 can establish LIPA bearers with gateway 116 for device 102. In this example, devices, such as device 102, can perform actions such as at least one of accessing the services or resources of the local network, providing local network devices with 118 and 120 with services or access to resources of the device via access point 104, and/or the like through gateway 116 via access point 104 without traversing network node 106 or similar nodes of the mobile network. Gateway 116 can also provide PDN connectivity in the form of SIPTO, as described, by offloading communications from device 102 via access point 104 to router 112.

For example, access point 104 may or may not allow PDN connectivity to device 102 or to any devices, and/or may provide PDN connectivity for certain APNs. As described further herein, device 102 can receive PDN connectivity parameters 122 that specify whether device 102 can initiate a PDN connection to a gateway 116 from access point 104, from one or more CSGs that may include access point 104, from one or more networks (e.g., public land mobile networks (PLMN)) that may include access point 104, and/or using one or more APNs that can be used for initiating the PDN connection. For example, device 102 can receive the PDN connectivity parameters 122 as part of subscription information and/or CSG subscription information (e.g., from subscription server 110), upon initiating a PDN connection with access point 104 (e.g., from mobility manager 108), and/or the like. If the PDN connectivity parameters 122 indicate that device 102 cannot initiate a PDN connection through access point 104, using a certain APN or otherwise, device 102 can refrain from requesting the PDN connection, which can mitigate unnecessary signaling.

Additionally, device 102 can determine an alternative action where device 102 is unable to request the PDN connection from access point 104. Moreover, for example, device 102 can receive PDN connection parameters from mobility manager 108 as part of a rejected PDN connection attempt to access point 104, as described further herein. These PDN connectivity parameters, for example, can specify a CSG or PLMN for which device 102 cannot request PDN connections (e.g., relating to certain APNs or otherwise). Moreover, though described in terms of establishing PDN connections (e.g., in LTE networks), it is to be appreciated that aspects described herein can be similarly applied to establishing packet data protocol (PDP) contexts (e.g., in UMTS networks).

Figure 2:
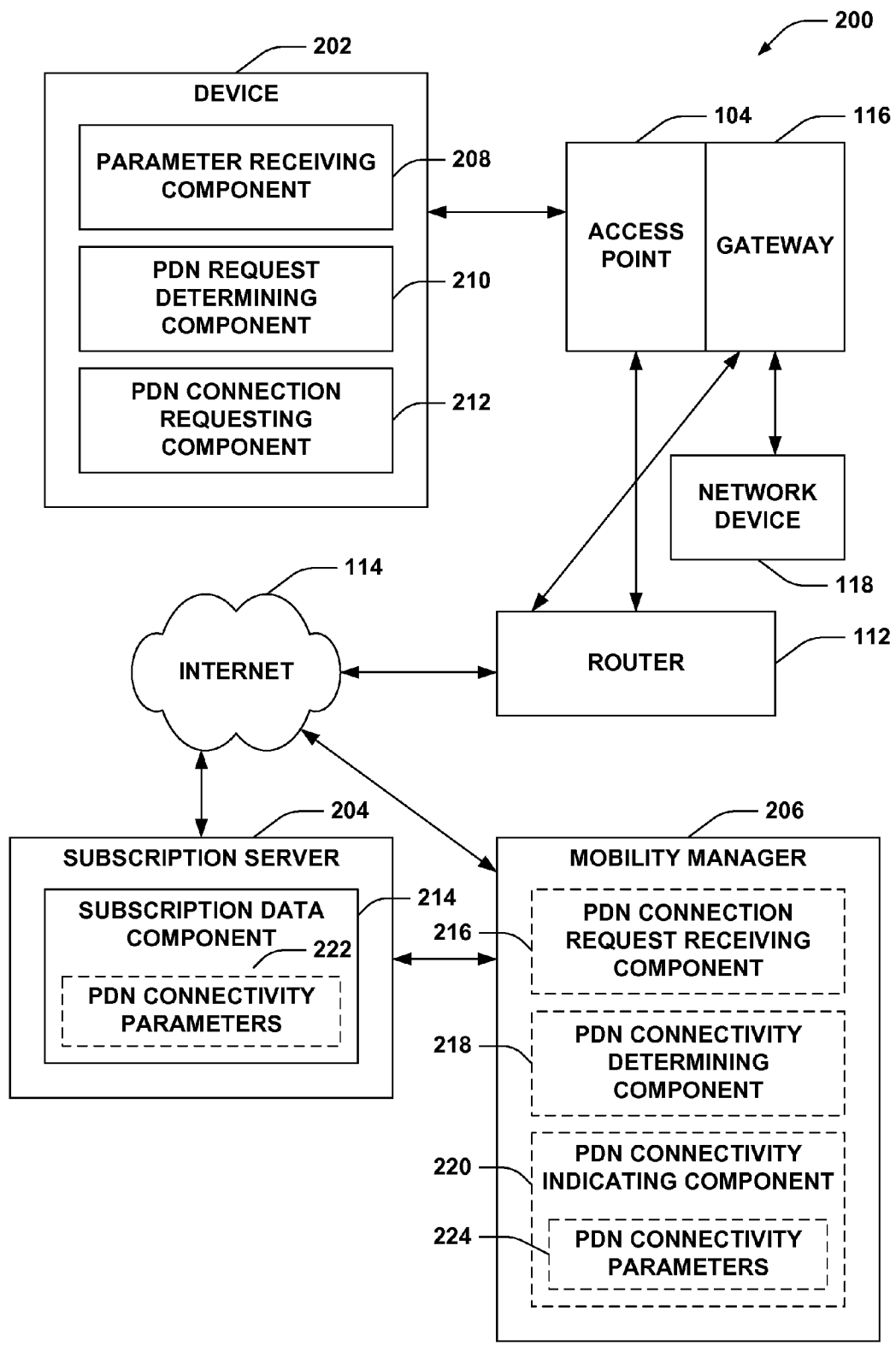
FIG. 2 is a block diagram of an aspect of an example system for determining whether to establish a PDN connection to one or more access points.

Turning to FIG. 2, an example wireless communication system 200 is illustrated that facilitates determining whether to initiate PDN connections in a wireless network. System 200 can include a device 202 that can communicate with one or more access points to receive access to a mobile network, an access point 104 that provides open or restricted access or a combination thereof to one or more devices, and a gateway 116 that facilitates communicating with one or more networks. System 200 also comprises a router 112 that can facilitate communications between access point 104 or gateway 116 and an Internet 114, as described, as well as a network device 118 that can be coupled to gateway 116. Moreover, system 200 comprises a subscription server 204 that provides subscription information related to a device, and a mobility manager 206 that authenticates one or more devices to communicate with one or more core network components.

In one example, device 202 can be a UE, modem (or other tethered device), a portion thereof, and/or the like, and access point 104 can be a femtocell, picocell, H(e)NB, or similar access point, a portion thereof, etc., as described. In addition, for example, gateway 116 can be a substantially any gateway or router, such as but not limited to a serving gateway (S-GW) packet data network (PDN) gateway (P-GW), a gateway GPRS support node (GGSN), etc., and mobility manager 206 can be a MME, SGSN, MSC, VLR, or similar node. In addition, as described, gateway 116 can be co-located and/or implemented within access point 104 in another example. Subscription server 204 can be an HSS, HLR, or similar component. Moreover, it is to be appreciated that additional components or nodes can be present between those shown (e.g., one or more gateways or routers can be present between access point 104 and gateway 116, between access point 104 and mobility manager 206, between mobility manager 206 and subscription server 204, etc.) to facilitate access.

As described, in one example, access point 104 can provide PDN connectivity to device 202 in the form of LIPA with gateway 116 for communicating with network device 118 through gateway 116, in the form of SIPTO with gateway 116 for offloading packets to router 112 for communicating over Internet 114, etc., without traversing core components of a mobile network, such as mobility manager 206 (e.g., other than for authentication of device 202 in initially establishing the PDN connection). In one example, as described above however, access point 104 may not allow PDN connections, may allow PDN connections for certain APNs, etc. for a given device.

Device 202 can comprise a parameter receiving component 208 for obtaining PDN connectivity parameters from one or more core components of a mobile network, a PDN request determining component 210 for obtaining a request for initiating a PDN connection, and a PDN connection requesting component 212 for determining whether to initiate a PDN connection with the access point based at least in part on the PDN connectivity parameters. Subscription server 204 can comprise a subscription data component 214 for communicating subscription information to a device. Mobility manager 206 can optionally include a PDN connection request receiving component 216 for obtaining a PDN connection request from a device, a PDN connectivity determining component 218 for determining whether the device is permitted to establish a PDN connection with an access point, and/or a PDN connectivity indicating component 220 for communicating PDN connectivity parameters to the device based at least in part on the PDN connection request.

According to an example, device 202 can communicate with access point 104 to receive access to a mobile network, as described. In an example, upon requesting mobile network access from access point 104, access point 104 can communicate with one or more core network components through router 112 and Internet 114, such as mobility manager 206 and/or subscription server 204. For example, mobility manager 206 can be utilized to authenticate device 202 to communicate in the mobile network. In addition, subscription data component 214 can retrieve subscription information corresponding to the device 202 for communicating thereto. The subscription information can be general subscription information for device 202, CSG subscription information relating to CSGs of which device 202 is a member, and/or the like. In addition, for example, subscription data component 214 can communicate PDN connectivity parameters 222 as part of device 202 subscription information or CSG subscription information. For example, subscription server 204 can communicate the PDN connectivity parameters 222—e.g., along with or as part of the subscription information—to device 202 via connection with access point 104 (e.g., through Internet 114, router 112, etc).

As described, the PDN connectivity parameters 222 can relate to whether certain access points, a set of access points (e.g., access points corresponding to the same CSG, PLMN, etc.), and/or the like allow PDN connections to a local gateway, for example gateway 116, APNs for which PDN connections are allowed at the access points, CSGs, PLMNs, etc., and/or the like, which can be specific for the device 202. As described, for example, gateway 116 can be a local gateway that allows access to router 112, network device 118, etc., and/or to/from access point 104 depending on one or more parameters, as described herein. Thus, for example, the PDN connectivity parameters 222 can include a list of access points (e.g., by identifier) from which device 202 can initiate a PDN connection (e.g., a LIPA and/or SIPTO PDN connection) to a local gateway. In another example, the PDN connectivity parameters 222 can include a list of CSGs (e.g., by identifier) with which device 202 can initiate a PDN connection. In yet another example, the PDN connectivity parameters 222 can include a list of APNs for each access point or CSG in the list for which device can initiate a PDN connection.

In another example, the PDN connectivity parameters 222 can be an extension of a list, such as one or more parameters in a list that specify whether the device 202 is able to initiate a PDN connection for a given list item. Thus, for example, the PDN connectivity parameters 222 can include an indicator for one or more CSGs listed in CSG subscription information specifying whether PDN connections to a local gateway are allowed for the CSG and/or which type of PDN connections are allowed (e.g., LIPA, SIPTO, etc.). In another example, thus, the PDN connectivity parameters 222 can be a list of APNs relating to each CSG listed in the CSG subscription information for which PDN connections (or certain types of PDN connections) are allowed, and/or the like. Again, the list of APNs can be a list of all APNs with indicators for those APNs for which PDN connections are allowed, a list of those APNs for which PDN connections are allowed, and/or the like.

In any case, parameter receiving component 208 can obtain the PDN connectivity parameters 222 for determining whether to request a PDN connection in one or more instances. In another example, parameter receiving component 208 can obtain the PDN connectivity parameters 222 from one or more other core mobile network components (e.g., as part of an open mobile alliance (OMA) device management (DM) procedure that includes the PDN connectivity parameters for one or more corresponding access points, CSGs, etc., and/or the like). For example, PDN request determining component 210 can obtain a request for a PDN connection from within device 202, a system utilizing device 202 (e.g., a computer where device 202 is a modem), and/or the like. In this example, PDN connection requesting component 212 can determine whether to initiate a PDN connection from an access point, determine an APN to utilize for requesting the PDN connection from the access point, and/or the like based at least in part on the PDN connectivity parameters 222.

For example, device 202 can be communicating with access point 104, which can include an active mode connection to access point 104 for accessing the mobile network, an idle-mode connection to access point 104 for receiving paging signals from the mobile network, and/or the like. Upon PDN request determining component 210 obtaining a request for PDN connectivity to a local gateway, PDN connection requesting component 212 can determine whether to request PDN connectivity to the local gateway (e.g., gateway 116) from access point 104 based on the PDN connectivity parameters 222. For example, where the PDN connectivity parameters 222 specify that access point 104 does not allow PDN connections to a local gateway, PDN connection requesting component 212 can refrain from requesting a PDN connection. In this example, device 202 can take an alternative action, such as requesting a PDN connection from one or more neighboring access points (not shown) if permitted. Where PDN connectivity parameters 222 specify that access point 104 does allow PDN connections to a local gateway, PDN connection requesting component 212 can initiate a PDN connection with access point 104 by transmitting a PDN connectivity request (e.g., a LIPA PDN connectivity request, SIPTO PDN connectivity request, etc.) thereto, as described.

In a more specific example, PDN connection requesting component 212 can determine whether the device 202 is allowed to request a PDN connection to a local gateway from access points of a CSG or PLMN related to access point 104. For example, device 202 can receive an indication of the CSG or PLMN of access point 104 by virtue of communicating therewith, and PDN connection requesting component 212 can determine whether PDN connectivity parameters 222 specify that a PDN connection (e.g., or a certain type of PDN connection, such as LIPA, SIPTO, etc.) is allowed for the CSG or PLMN. PDN connection requesting component 212 can accordingly initiate or refrain from initiating a PDN connection to gateway 116 via access point 104.

In yet another example, PDN request determining component 210 can obtain a APN related to the requested PDN connection. PDN connection requesting component 212 can accordingly determine whether a PDN connection is allowed for the APN at access point 104, at the corresponding CSG or PLMN, etc., based at least in part on the PDN connectivity parameters 222. PDN connection requesting component 212 can accordingly initiate or refrain from initiating the PDN connection.

In another example, based on PDN request determining component 210 obtaining a request for a PDN connection to a local gateway, PDN connection requesting component 212 can select an APN for specifying in requesting a PDN connection with access point 104. For example, PDN connection requesting component 212 can determine one or more APNs for which PDN connections (e.g., and/or certain types of PDN connections) are allowed at access point 104. For example, this can include PDN connection requesting component 212 determining the one or more APNs specified in the PDN connectivity parameters 222 relating to allowing PDN connectivity for device 202 at access point 104, at a CSG of which access point 104 is a member, at a PLMN of access point 104, and/or the like. PDN connection requesting component 212 can accordingly select the APN based at least in part on the request for the PDN connection (e.g., and/or a type of PDN connection specified in the request for the PDN connection) to specify in requesting the PDN connection.

Moreover, in an example, the PDN connectivity parameters 222 can specify differing levels of PDN connectivity, and PDN connection requesting component 212 can further determine whether to initiate a PDN connection to the local gateway, such as gateway 116, from access point 104 based on the levels of PDN connectivity. For example, where the PDN connectivity parameters 222 correspond to LIPA, an indication of whether LIPA is allowed via access point 104 can correspond to levels of allowance, such as LIPA only, LIPA conditional, or LIPA prohibited. For example, a level of allowance can be associated with one or more APNs related to access point 104, a CSG of access point 104, a PLMN of access point 104, etc., in the PDN connectivity parameters 222. In this example, PDN connection requesting component 212 can refrain from establishing a PDN connection for a related APN (e.g., received at PDN request determining component 210) using access point 104 where LIPA prohibited is specified for the APN. In another example, where LIPA conditional is specified, PDN connection requesting component 212 can refrain from establishing the PDN connection using access point 104 where the respective condition is not met. In one example, the condition can relate to a location of device 202, a network within which the device 202 is communicating (e.g., a network related to gateway 116) or a related address, and/or the like.

Furthermore, for example, where PDN request determining component 210 obtains a request for a PDN connection without an APN specified, PDN connection requesting component 212 can select a PDN in the PDN connectivity parameters 222 for which LIPA only is specified (e.g., or LIPA conditional so long as the condition is specified) for requesting the PDN connectivity, if such an APN exists in the PDN connectivity parameters 222.

In another example, PDN connection requesting component 212 can attempt to initiate a PDN connection to access point 104 where access point 104 may not allow such connections from device 202. For example, the device 202 may not have been provisioned with PDN connectivity parameters 222, incorrectly provisioned, etc. In another example, the PDN connectivity parameters 222 can be removed from device 202 (e.g., by PDN connection requesting component 212 or another component) based at least in part on expiration of a timer, powering down device 202, removal of a subscriber identity modulate (SIM) card from the device 202, based on device 202 communicating with one or more other access points, and/or other events or triggers. In any case, access point 104 can communicate with mobility manager 206 on behalf of device 202 to authenticate the device 202 for the PDN connection. For example, PDN connection request receiving component 216 can obtain the PDN connection request of device 202 from access point 104.

In this example, PDN connectivity determining component 218, for example, can determine the request is for PDN connectivity (e.g., based on the APN specified in the request). For example, PDN connectivity determining component 218 can determine the APN in the request is a PDN connectivity APN based at least in part on information received for access point 104. Thus, PDN connectivity determining component 218 can also determine whether device 202 is permitted to initiate PDN connections to a local gateway at the access point 104. This can be based at least in part on PDN connectivity parameters 224 received for device 202 (e.g., during device 202 initialization on the mobile network), PDN connectivity parameters 224 can be received from access point 104 or an access point management server, an indication from access point 104 that device 202 is not allowed to request PDN connectivity from access point 104, and/or the like. For example, the PDN connectivity parameters 224 can be different from PDN connectivity parameters 222, as described below, while still indicating information related to whether device 202 can request PDN connectivity with certain access points, CSGs, PLMNs, etc.

In any case, where PDN connectivity determining component 218 determines that device 202 is not allowed to initiate a PDN connection to a local gateway, such as gateway 116, using access point 104, PDN connectivity indicating component 220 can specify PDN connectivity parameters 224 to device 202 along with an indication that device 202 is unable to initiate a PDN connection using access point 104. PDN connectivity parameters 224, for example, can specify that device 202 is not permitted to initiate a PDN connection using access point 104, using any access points in the same CSG as access point 104, using any access points in the same PLMN as access point 104, and/or the like. For example, the PDN connectivity parameters 224 can include a specific CSG and/or PLMN identifier and an indication that device 202 cannot initiate PDN connections from access points advertising or otherwise related to the CSG or PLMN identifier.

In one example, PDN connectivity indicating component 220 can communicate the PDN connectivity parameters 224 to device using one or more non-access stratum (NAS) messages. In an example, the PDN connectivity parameters 224 can correspond to a cause code in the one or more NAS messages for rejecting the PDN connectivity request from device 202. In one example, PDN connection requesting component 212 can obtain the cause code and can determine the PDN connectivity parameters 224. For example, the cause code can indicate that device 202 is unable to establish PDN connections to a local gateway using any access point in the CSG or PLMN of access point 104. In this example, PDN connection requesting component 212 can store a CSG and/or PLMN identifier related to access point 104 for subsequently comparing to one or more other access points in determining whether to attempt PDN connection using the one or more other access points. Parameter receiving component 208 can obtain the PDN connectivity parameters 224, and PDN connection requesting component 212 can utilize the PDN connectivity parameters 224 in subsequently determining whether to initiate a PDN connection using one or more other access points, as described above with respect to PDN connectivity parameters 222.

For example, when communicating with another access point (not shown), PDN connection requesting component 212 can determine whether the other access points are in the same CSG or part of the same PLMN as access point 104; if so, PDN connection requesting component 212 can refrain from initiating a PDN connection thereto based at least in part on the PDN connectivity parameters 224 indicating PDN connections are not allowed in the CSG or PLMN. In one example, PDN connectivity parameters 224 can be or can be similar to or a subset of PDN connectivity parameters 222 as related to device 202, access point 104, one or more CSGs or PLMNs, etc. Furthermore, device 202 can remove PDN connectivity parameters 224 based at least in part on one or more events or triggers, as described in connection with PDN connectivity parameters 222.

Figure 3:
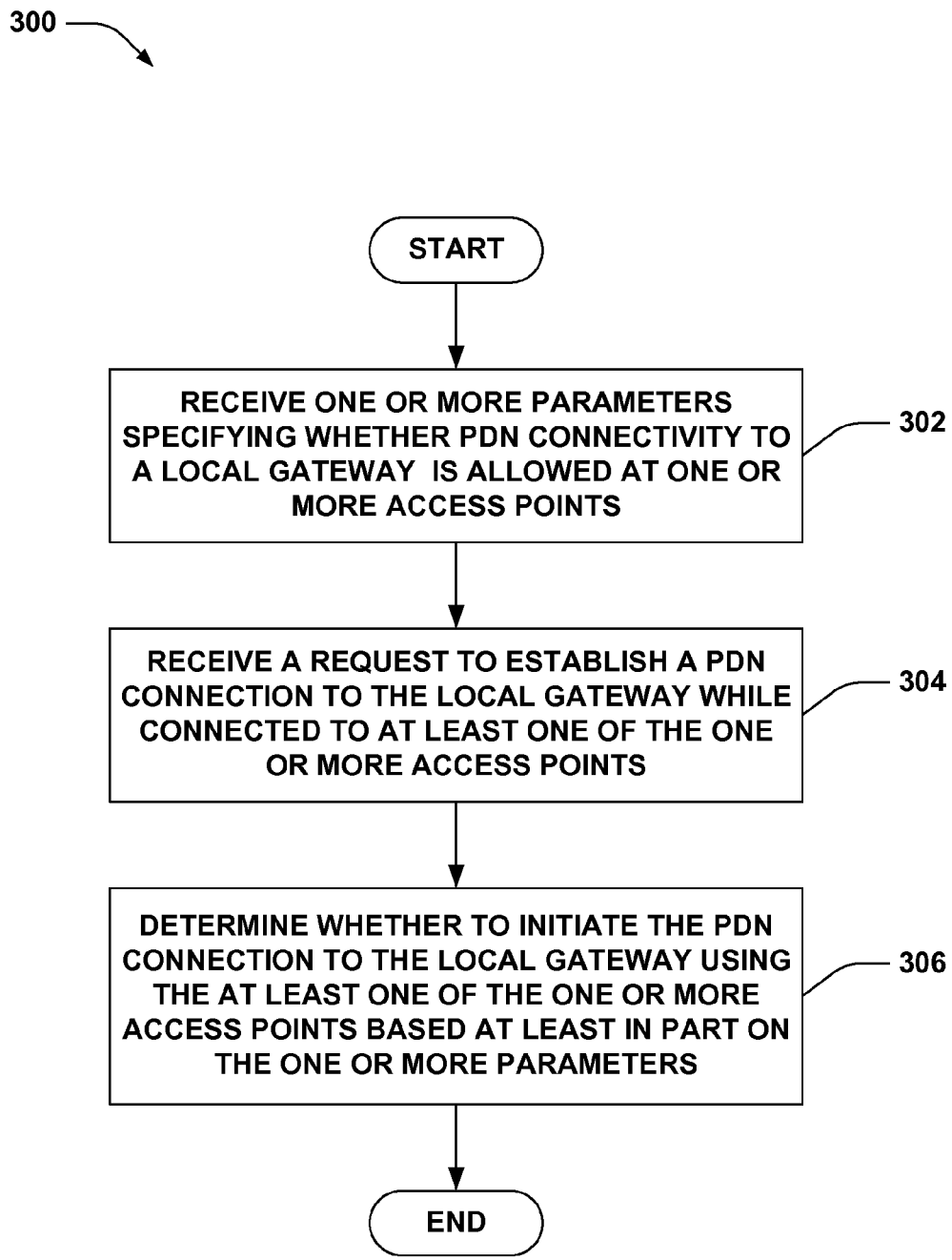
FIG. 3 is a flow chart of an aspect of an example methodology for determining whether to establish a PDN connection.
Figure 4:
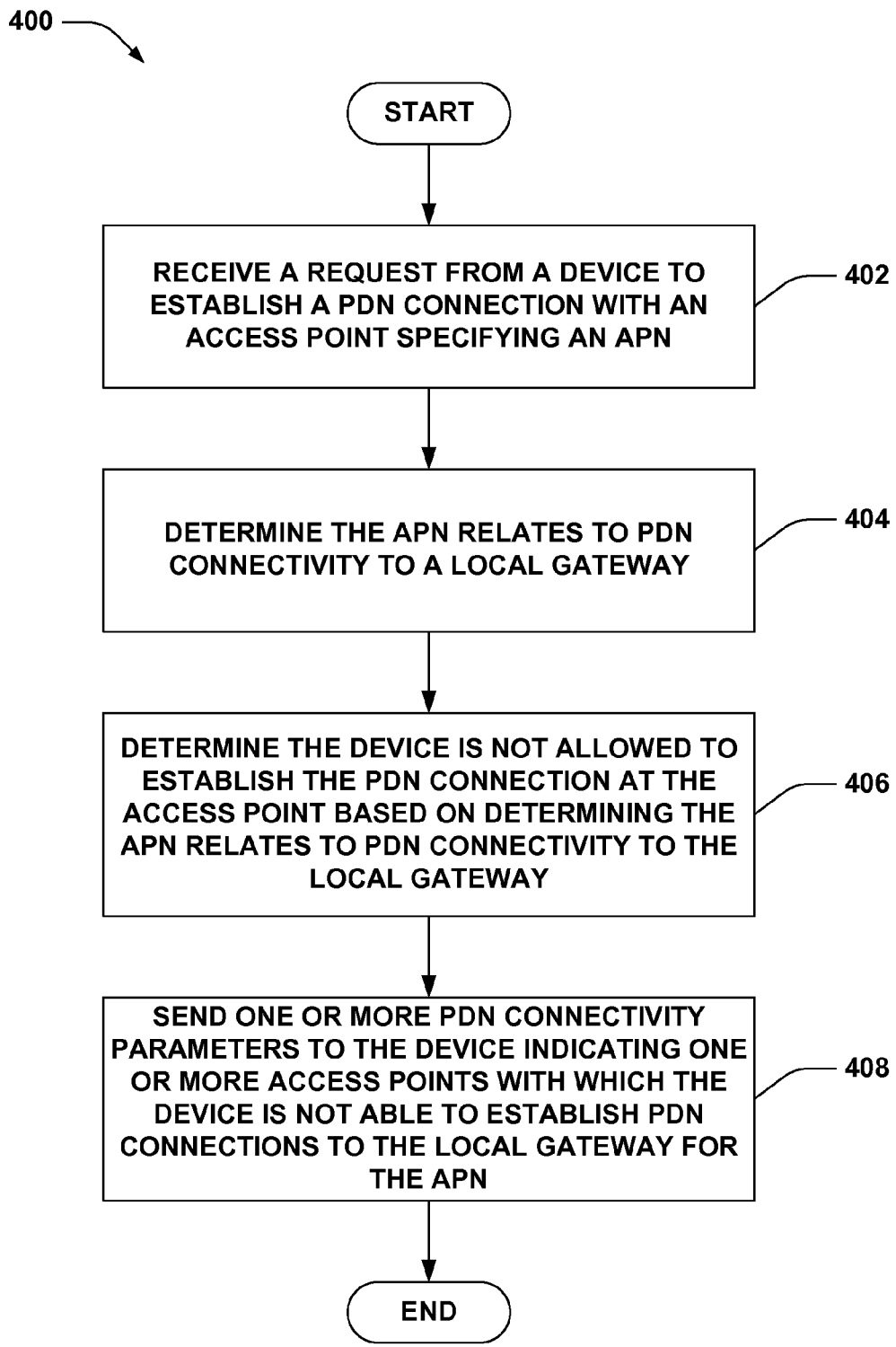
FIG. 4 is a flow chart of an aspect of an example methodology that communicates PDN connectivity parameters.
Figure 5:
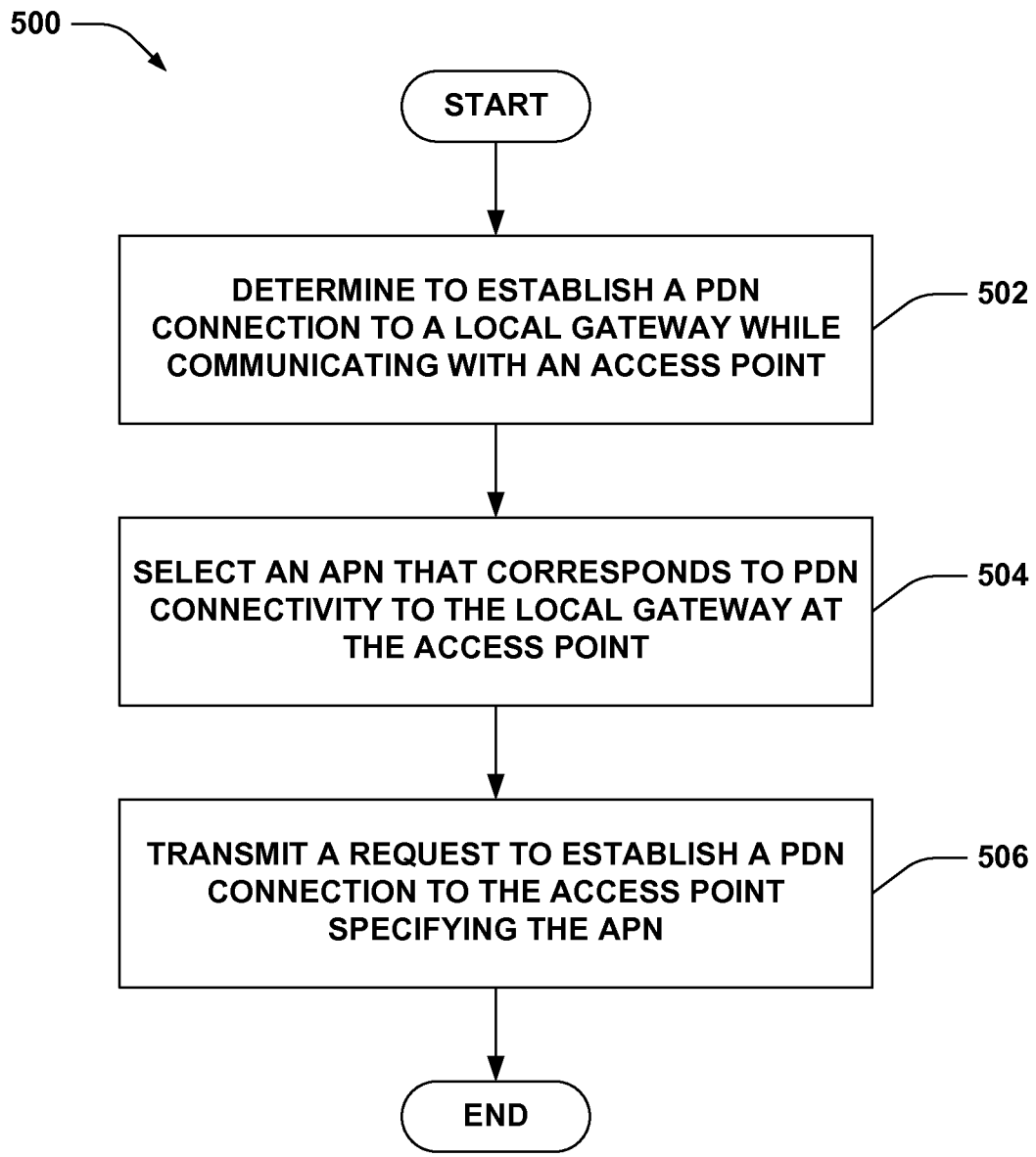
FIG. 5 is a flow chart of an aspect of an example methodology for transmitting a PDN connection request.

Referring to FIGS. 3-5, example methodologies relating to determining whether to initiate PDN connections in a wireless network are illustrated. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, it is to be appreciated that a methodology could alternatively be represented as a series of interrelated states or events, such as in a state diagram. Moreover, not all illustrated acts may be required to implement a methodology in accordance with one or more embodiments.

Referring to FIG. 3, an example methodology 300 is displayed that facilitates determining whether to initiate a PDN connection to an access point. At 302, one or more parameters can be received specifying whether PDN connectivity to a local gateway is allowed at one or more access points. For example, the one or more parameters can correspond to PDN connectivity parameters received in subscription information, CSG subscription information, etc., received from a network component as part of a NAS message rejecting a request for a PDN connection using an access point, and/or the like. In addition, the one or more parameters can correspond to indicators specifying whether PDN connections are allowed at an access point, at access points related to a CSG, at access points related to a PLMN, etc., and can be device-specific. Moreover, the one or more parameters can indicate a level of PDN connectivity to a local gateway (e.g., LIPA only, LIPA conditional, LIPA prohibited, etc.).

At 304, a request to establish a PDN connection to the local gateway can be received while connected to at least one of the one or more access points. In an example, the request can specify an APN to utilize in establishing the PDN connection at the at least one access point. In another example, an APN can be selected based at least in part on determining the request is for a PDN connection (e.g., based on determining one or more APNs in the one or more parameters that specify PDN connections are allowed for the APN). At 306, it can be determined whether to initiate the PDN connection to the local gateway using the at least one of the one or more access points based at least in part on the one or more parameters. For example, this can include determining whether PDN connections are allowed (e.g., to the access point, to a CSG related to the access point, to a PLMN related to the access point, for a specified APN, etc.) based on the one or more parameters, and determining to initiate the PDN connection where allowed, as described. In another example, where not allowed, it can be determined not to initiate the PDN connection at 306. Where the one or more parameters do not specify whether PDN connections are allowed for the access points, CSG, PLMN, related to the APN, etc., a PDN connection can be attempted, in one example, and if not allowed, PDN connection parameters can be received with a rejection, as described. In another example, where the one or more parameters do not specify whether PDN connections are allowed, it can be determined not to initiate the PDN connection at 306.

Turning to FIG. 4, an example methodology 400 is displayed that facilitates rejecting a PDN connection request from a device. At 402, a request can be received from a device specifying an APN to establish a PDN connection with an access point. At 404, it can be determined that the APN relates to PDN connectivity at a local gateway. For example, this can be based at least in part on one or more PDN connectivity parameters related to the device or access point received from one or more core network components, the access point, and/or the like. As described, the one or more PDN connectivity parameters can correspond to a list of APNs for which PDN connectivity is allowed, which can correspond to an access point, a list of access points, CSGs, PLMNs, etc., for which the device can request a PDN connection, and/or the like.

At 406, it can be determined that the device is not allowed to establish the PDN connection at the access point based on determining the APN relates to PDN connectivity to the local gateway. Thus, as described, this can be based at least in part on the PDN connection parameters specifying that the device is not allowed PDN connections for the APN, at the access point, CSG, or PLMN, etc., and/or the PDN connection parameters not specifying that the device can request PDN connections for the APN, at the access point, CSG, PLMN, etc. At 408, one or more PDN connectivity parameters can be sent to the device indicating one or more access points with which the device is not able to establish PDN connections to the local gateway for the APN. Thus, for example, the one or more PDN connectivity parameters can specify one or more access points related to the access point, a CSG of the access point, a PLMN of the access point, etc., for which the device cannot establish PDN connections (e.g., for the APN or otherwise). For example, this can be part of one or more cause codes in a NAS rejection message rejecting establishment of the PDN connection. As described, the concepts can be applied for PDP contexts as well, and thus where the above steps correspond to a PDN connection, it is to be appreciated that the steps can be modified for PDP contexts.

Referring to FIG. 5, an example methodology 500 for communicating a request to establish a PDN connection is illustrated. At 502, it can be determined to establish a PDN connection to a local gateway while communicating with an access point. For example, a request can be received for establishing the PDN connection (e.g., from an application, a device, etc.). At 504, an APN that corresponds to PDN connectivity to the local gateway at the access point can be selected. For example, this can include determining an APN from the PDN connectivity parameters for which PDN connectivity is allowed. At 506, a request to establish a PDN connection specifying the APN can be transmitted to the access point. In one example, the PDN connection can be established with the local gateway via the access point.

It will be appreciated that, in accordance with one or more aspects described herein, inferences can be made regarding determining whether to request to establish a PDN connection based on PDN connectivity parameters, determining an APN to specify for requesting a PDN connection, and/or the like, as described. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 6:
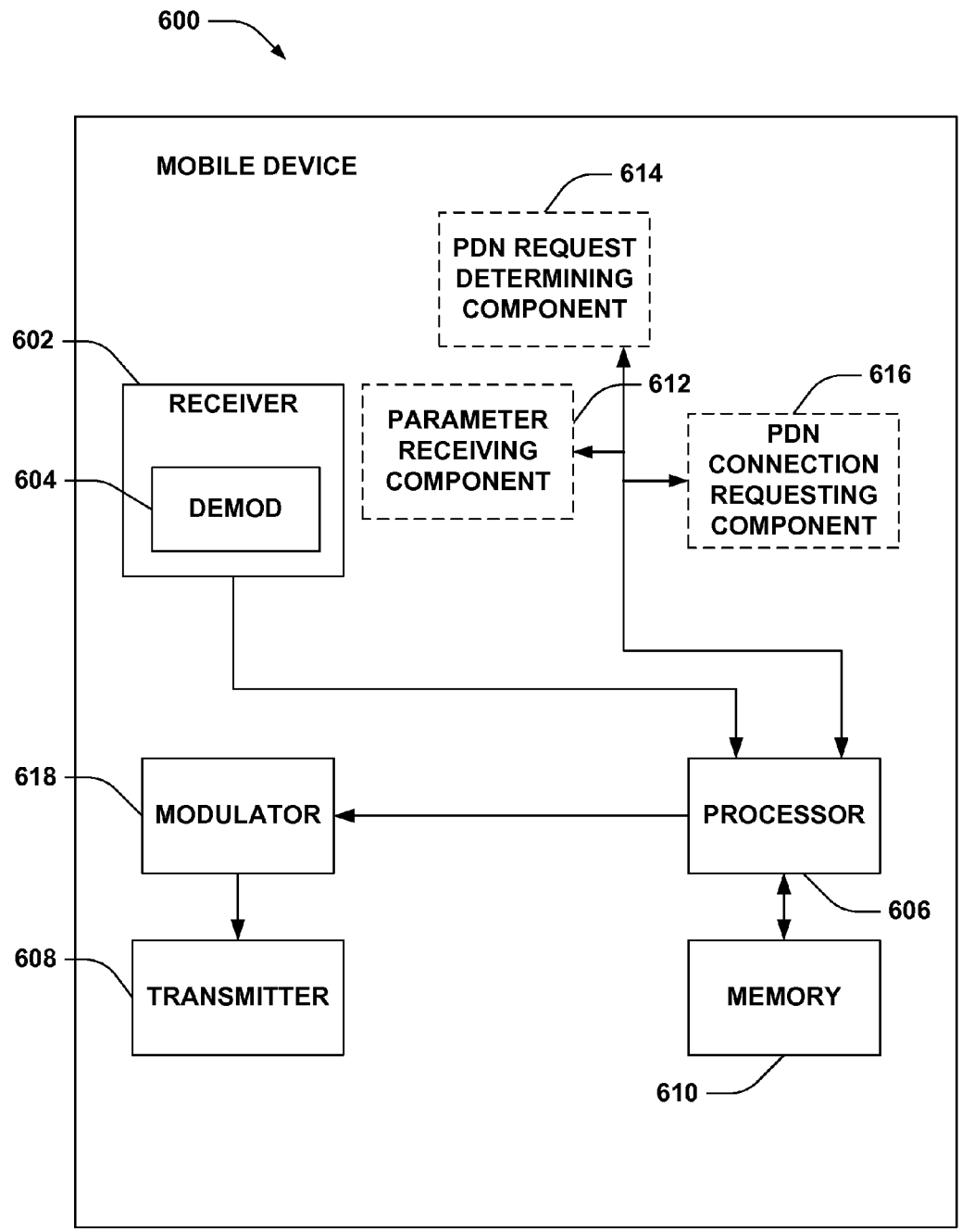
FIG. 6 is a block diagram of an example mobile device for determining whether to establish a PDN connection.

FIG. 6 is an illustration of a mobile device 600 that facilitates determining whether to initiate a PDN connection. Mobile device 600 comprises a receiver 602 that receives a signal from, for instance, a receive antenna (not shown), performs typical actions on (e.g., filters, amplifies, downconverts, etc.) the received signal, and digitizes the conditioned signal to obtain samples. Receiver 602 can comprise a demodulator 604 that can demodulate received symbols and provide them to a processor 606 for channel estimation. Processor 606 can be a processor dedicated to analyzing information received by receiver 602 and/or generating information for transmission by a transmitter 608, a processor that controls one or more components of mobile device 600, and/or a processor that both analyzes information received by receiver 602, generates information for transmission by transmitter 608, and controls one or more components of mobile device 600. For example, processor 606 can perform one or more functions as described herein to determine whether to request a PDN connection.

Mobile device 600 can additionally comprise memory 610 that is operatively coupled to processor 606 and that can store data to be transmitted, received data, information related to available channels, data associated with analyzed signal and/or interference strength, information related to an assigned channel, power, rate, or the like, and any other suitable information for estimating a channel and communicating via the channel. Memory 610 can additionally store protocols and/or algorithms associated with estimating and/or utilizing a channel (e.g., performance based, capacity based, etc.), determining whether to request a PDN connection, and/or the like.

It will be appreciated that the data store (e.g., memory 610) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 610 of the subject systems and methods is intended to comprise, without being limited to, these and any other suitable types of memory.

Processor 606 can further be optionally operatively coupled to a parameter receiving component 612, which can be similar to parameter receiving component 208, a PDN request determining component 614, which can be similar to PDN request determining component 210, and/or a PDN connection requesting component 616, which can be similar to PDN connection requesting component 212. Mobile device 600 still further comprises a modulator 618 that modulates signals for transmission by transmitter 608 to, for instance, a base station, another mobile device, etc. Although depicted as being separate from the processor 606, it is to be appreciated that the parameter receiving component 612, PDN request determining component 614, PDN connection requesting component 616, demodulator 604, and/or modulator 618 can be part of the processor 606 or multiple processors (not shown), and/or stored as instructions in memory 610 for execution by processor 606.

Figure 7:
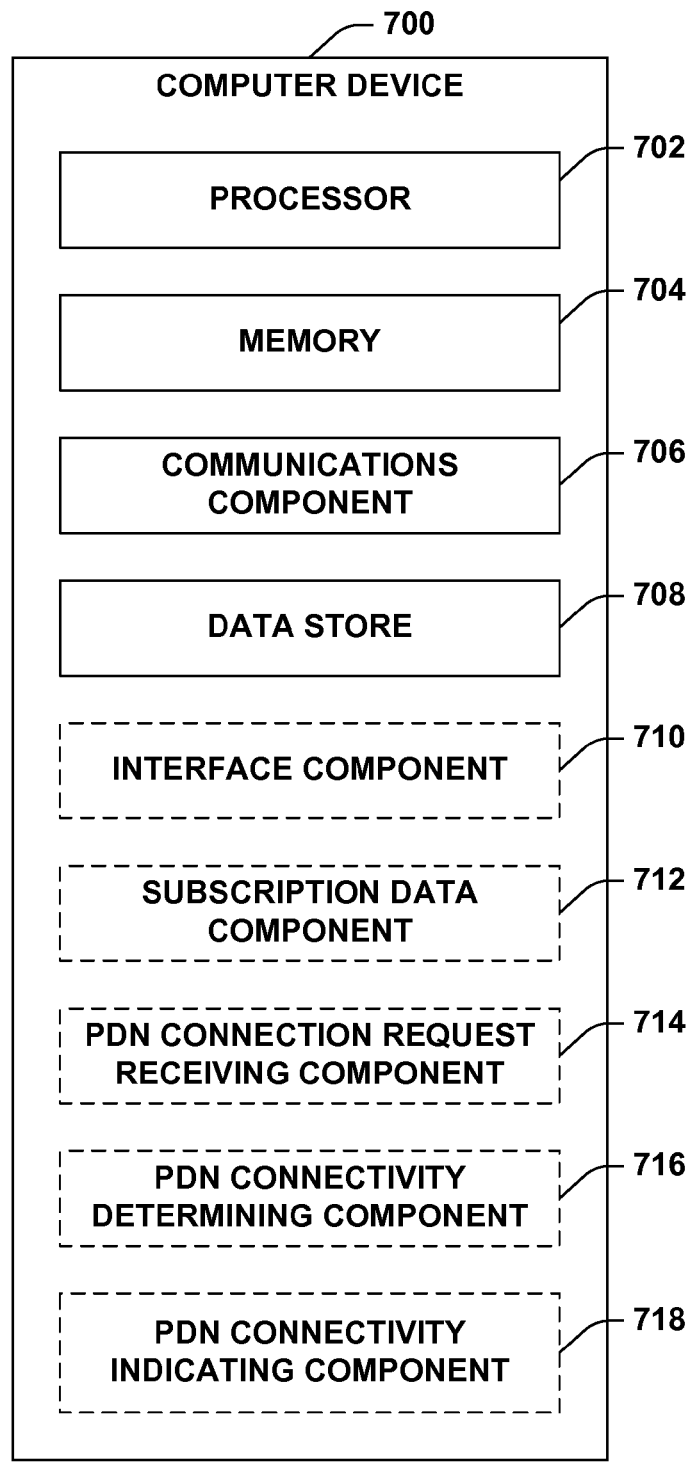
FIG. 7 is a block diagram of an example computing device according to various aspects described herein.

Referring to FIG. 7, in one aspect, any of network nodes 106, mobility managers 108, or 206, subscription servers 110 or 204, etc. (e.g., FIGS. 1-2) can be represented by computer device 700. Computer device 700 includes a processor 702 for carrying out processing functions associated with one or more of components and functions described herein. Processor 702 can include a single or multiple set of processors or multi-core processors. Moreover, processor 702 can be implemented as an integrated processing system and/or a distributed processing system.

Computer device 700 further includes a memory 704, such as for storing local versions of applications being executed by processor 702. Memory 704 can include substantially any type of memory usable by a computer, such as random access memory (RAM), read only memory (ROM), tapes, magnetic discs, optical discs, volatile memory, non-volatile memory, and any combination thereof. Computer device 700 also includes one or more components 706-718, which can be stored in memory 704, executed by processor 702 (e.g., based on instructions stored in memory 704), be implemented within one or more processors 702, and/or the like.

Further, computer device 700 includes a communications component 706 that provides for establishing and maintaining communications with one or more parties utilizing hardware, software, and services as described herein. Communications component 706 may carry communications between components on computer device 700, as well as between computer device 700 and external devices, such as devices located across a communications network and/or devices serially or locally connected to computer device 700. For example, communications component 706 may include one or more buses, and may further include transmit chain components and receive chain components associated with a transmitter and receiver, respectively, operable for interfacing with external devices.

Additionally, computer device 700 may further include a data store 708, which can be any suitable combination of hardware and/or software, that provides for mass storage of information, databases, and programs employed in connection with aspects described herein. For example, data store 708 may be a data repository for applications not currently being executed by processor 702.

Computer device 700 may optionally include an interface component 710 operable to receive inputs from a user of computer device 700, and further operable to generate outputs for presentation to the user. Interface component 710 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, interface component 710 may include one or more output devices, including but not limited to a display, a speaker, a haptic feedback mechanism, a printer, any other mechanism capable of presenting an output to a user, or any combination thereof. In another example, interface component 710 can be an application programming interface (API) that can be accessed by one or more devices to perform functions on computer device 700.

In addition, in the depicted example, computer device 700 can optionally include one or more of subscription data component 712, which can be similar to subscription data component 214, PDN connection request receiving component 714, which can be similar to PDN connection request receiving component 216, PDN connectivity determining component 716, which can be similar to PDN connectivity determining component 218, and/or PDN connectivity indicating component 718, which can be similar to PDN connectivity indicating component 220. Thus, these components 712, 714, 716, and/or 718 can utilize processor 702 to execute instructions associated therewith, memory 704 to store information associated therewith, communications component 706 to carry out communications, and/or the like, as described. In addition, it is to be appreciated that computer device 700 can include additional or alternative components described herein.

Figure 8:
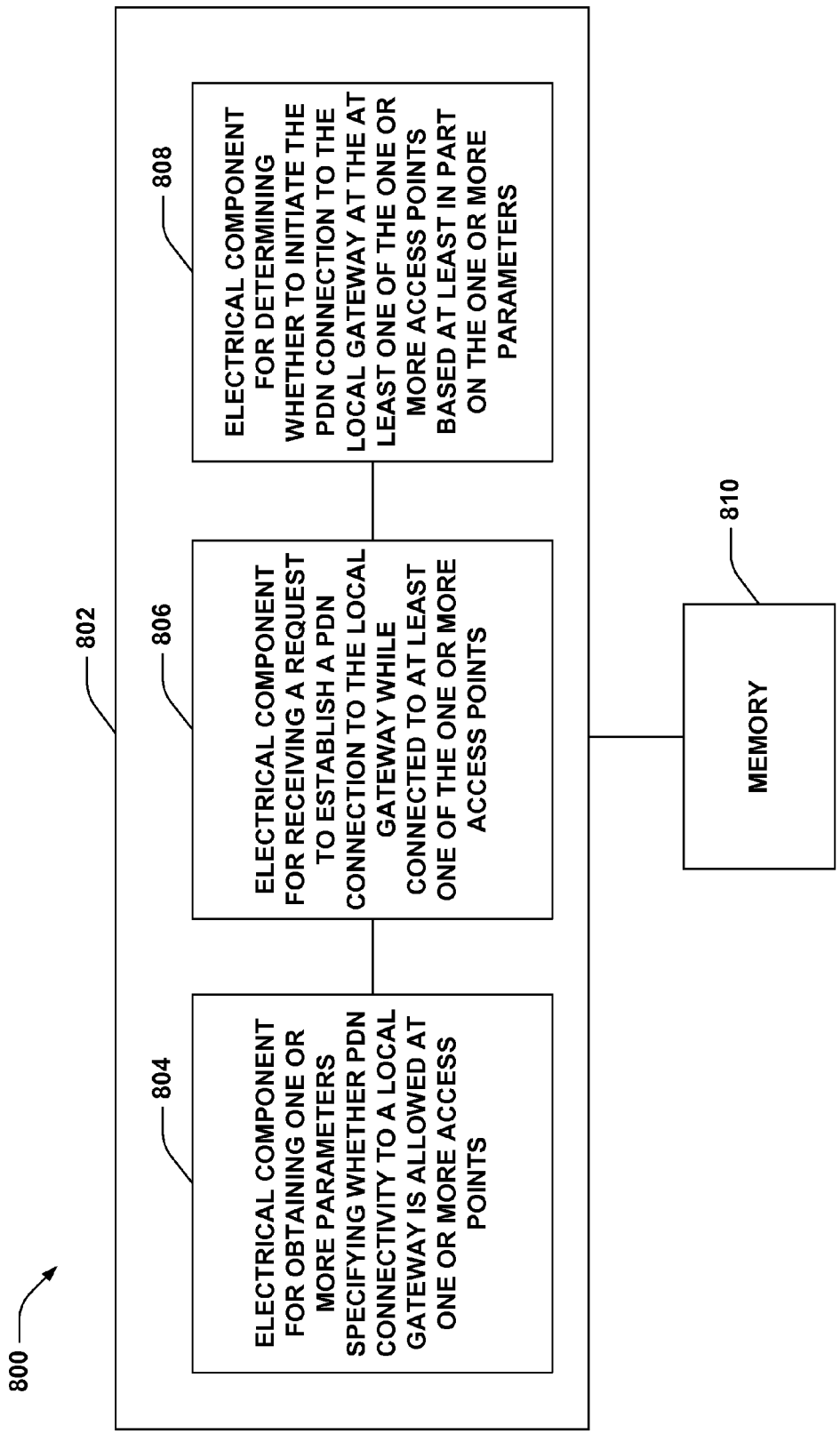
FIG. 8 is a block diagram of an example system that determines whether to establish a PDN connection.

With reference to FIG. 8, illustrated is a system 800 that determines whether to initiate a PDN connection with an access point. For example, system 800 can reside at least partially within a device, etc. It is to be appreciated that system 800 is represented as including functional blocks, which can be functional blocks that represent functions implemented by a processor, software, or combination thereof (e.g., firmware). System 800 includes a logical grouping 802 of electrical components that can act in conjunction. For instance, logical grouping 802 can include an electrical component for obtaining one or more parameters specifying whether PDN connectivity to a local gateway is allowed at one or more access points 804. As described, the one or more parameters can be PDN connectivity parameters received from one or more network components, an access point, and/or the like, as described.

Further, logical grouping 802 can comprise an electrical component for receiving a request to establish a PDN connection to the local gateway while connected to at least one of the one or more access points 806. For example, this can include receiving a request from an application, another device using system 800, and/or the like. Additionally, the request can include an APN that corresponds to PDN connectivity, as described above. Moreover, logical grouping 802 can include an electrical component for determining whether to initiate the PDN connection to the local gateway at the at least one of the one or more access points based at least in part on the one or more parameters 808. Thus, for example, electrical component 808 can determine such based at least in part on the APN in the request, one or more PDN connectivity parameters corresponding to the at least one access point, a CSG or PLMN thereof, etc.

For example, electrical component 804 can include a parameter receiving component 208, as described above. In addition, for example, electrical component 806, in an aspect, can include a PDN request determining component 210, as described above. Moreover, electrical component 808 can include a PDN connection requesting component 212, as described. Additionally, system 800 can include a memory 810 that retains instructions for executing functions associated with the electrical components 804, 806, and 808. While shown as being external to memory 810, it is to be understood that one or more of the electrical components 804, 806, and 808 can exist within memory 810.

In one example, electrical components 804, 806, and 808 can comprise at least one processor, or each electrical component 804, 806, and 808 can be a corresponding module of at least one processor. Moreover, in an additional or alternative example, electrical components 804, 806, and 808 can be a computer program product comprising a computer readable medium, where each electrical component 804, 806, and 808 can be corresponding code.

Figure 9:
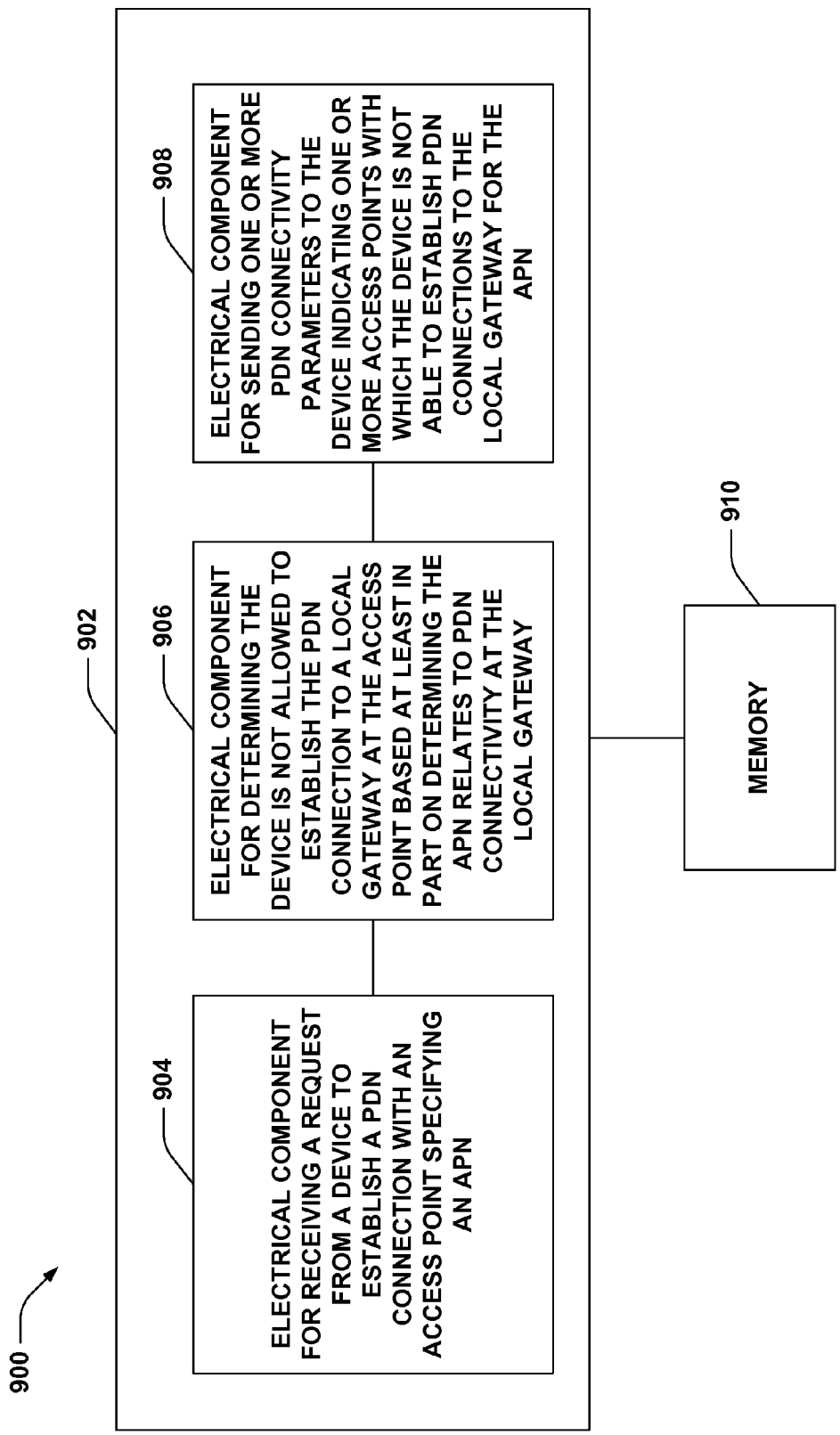
FIG. 9 is a block diagram of an example system that communicates PDN connectivity parameters.

With reference to FIG. 9, illustrated is a system 900 that sends PDN connectivity parameters to a device for which a PDN connection request is rejected. For example, system 900 can reside at least partially within an MME, SGSN, etc. It is to be appreciated that system 900 is represented as including functional blocks, which can be functional blocks that represent functions implemented by a processor, software, or combination thereof (e.g., firmware). System 900 includes a logical grouping 902 of electrical components that can act in conjunction. For instance, logical grouping 902 can include an electrical component for receiving a request from a device to establish a PDN connection with an access point specifying an APN 904. For example, the device can select the APN for requesting a PDN connection. Further, logical grouping 902 can comprise an electrical component for determining the device is not allowed to establish the PDN connection to a local gateway at the access point based at least in part on determining the APN relates to PDN connectivity 906.

For example, the APN can correspond to PDN connectivity, however, electrical component 906 can determine that the device is not allowed PDN connections with the access point based at least in part on one or more PDN connectivity parameters related to the access point, a CSG or PLMN thereof, etc. In addition, as described, the PDN connectivity parameters can be specific for the device and/or the specified APN. Moreover, logical grouping 902 can include an electrical component for sending one or more PDN connectivity parameters to the device indicating one or more access points with which the device is not allowed to establish PDN connections to the local gateway for the APN 908. For example, the PDN connectivity parameters can specify a CSG, PLMN, one or more access point identifiers, APNs, etc., for which the device is not allowed to request PDN connection. As described, the device can then use the PDN connectivity parameters in determining whether to subsequently request PDN connections with other access points in the CSG, PLMN, etc.

For example, electrical component 904 can include a PDN connection request receiving component 216, as described above. In addition, for example, electrical component 906, in an aspect, can include a PDN connectivity determining component 218, as described above. Moreover, electrical component 908 can include a PDN connectivity indicating component 220, as described. Additionally, system 900 can include a memory 910 that retains instructions for executing functions associated with the electrical components 904, 906, and 908. While shown as being external to memory 910, it is to be understood that one or more of the electrical components 904, 906, and 908 can exist within memory 910.

In one example, electrical components 904, 906, and 908 can comprise at least one processor, or each electrical component 904, 906, and 908 can be a corresponding module of at least one processor. Moreover, in an additional or alternative example, electrical components 904, 906, and 908 can be a computer program product comprising a computer readable medium, where each electrical component 904, 906, and 908 can be corresponding code.

Figure 10:
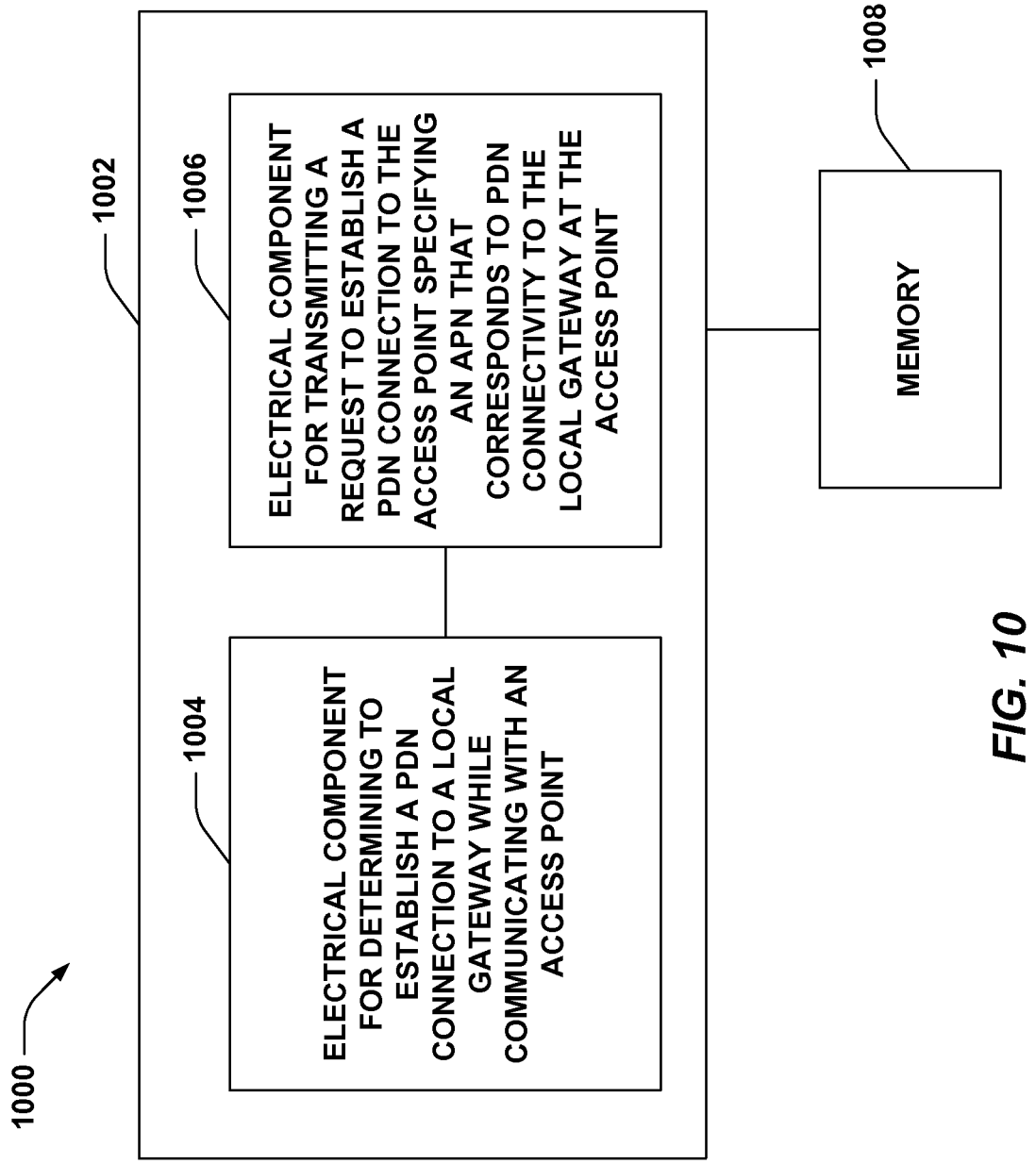
FIG. 10 is a block diagram of an example system that transmits a PDN connection request.

With reference to FIG. 10, illustrated is a system 1000 that communicates a request to establish a PDN connection. For example, system 1000 can reside at least partially within a device, etc. It is to be appreciated that system 1000 is represented as including functional blocks, which can be functional blocks that represent functions implemented by a processor, software, or combination thereof (e.g., firmware). System 1000 includes a logical grouping 1002 of electrical components that can act in conjunction. For instance, logical grouping 1002 can include an electrical component for determining to establish a PDN connection to a local gateway while communicating with an access point 1004. For example, this can be determined based on a request from an application or device communicating with system 1000, etc.

Further, logical grouping 1002 can comprise an electrical component for transmitting a request to establish a PDN connection to the access point specifying an APN that corresponds to the PDN connectivity to the local gateway at the access point 1006. As described, for example, the APN can be determined from PDN connectivity parameters that indicate the APN can be used to establish PDN connections with the access point. For example, electrical component 1004 can include a PDN request determining component 210, as described above. In addition, for example, electrical component 1006, in an aspect, can include a PDN connection requesting component 212, as described above. Additionally, system 1000 can include a memory 1008 that retains instructions for executing functions associated with the electrical components 1004 and 1006. While shown as being external to memory 1008, it is to be understood that one or more of the electrical components 1004 and 1006 can exist within memory 1008.

In one example, electrical components 1004 and 1006 can comprise at least one processor, or each electrical component 1004 and 1006 can be a corresponding module of at least one processor. Moreover, in an additional or alternative example, electrical components 1004 and 1006 can be a computer program product comprising a computer readable medium, where each electrical component 1004 and 1006 can be corresponding code.

Figure 11:
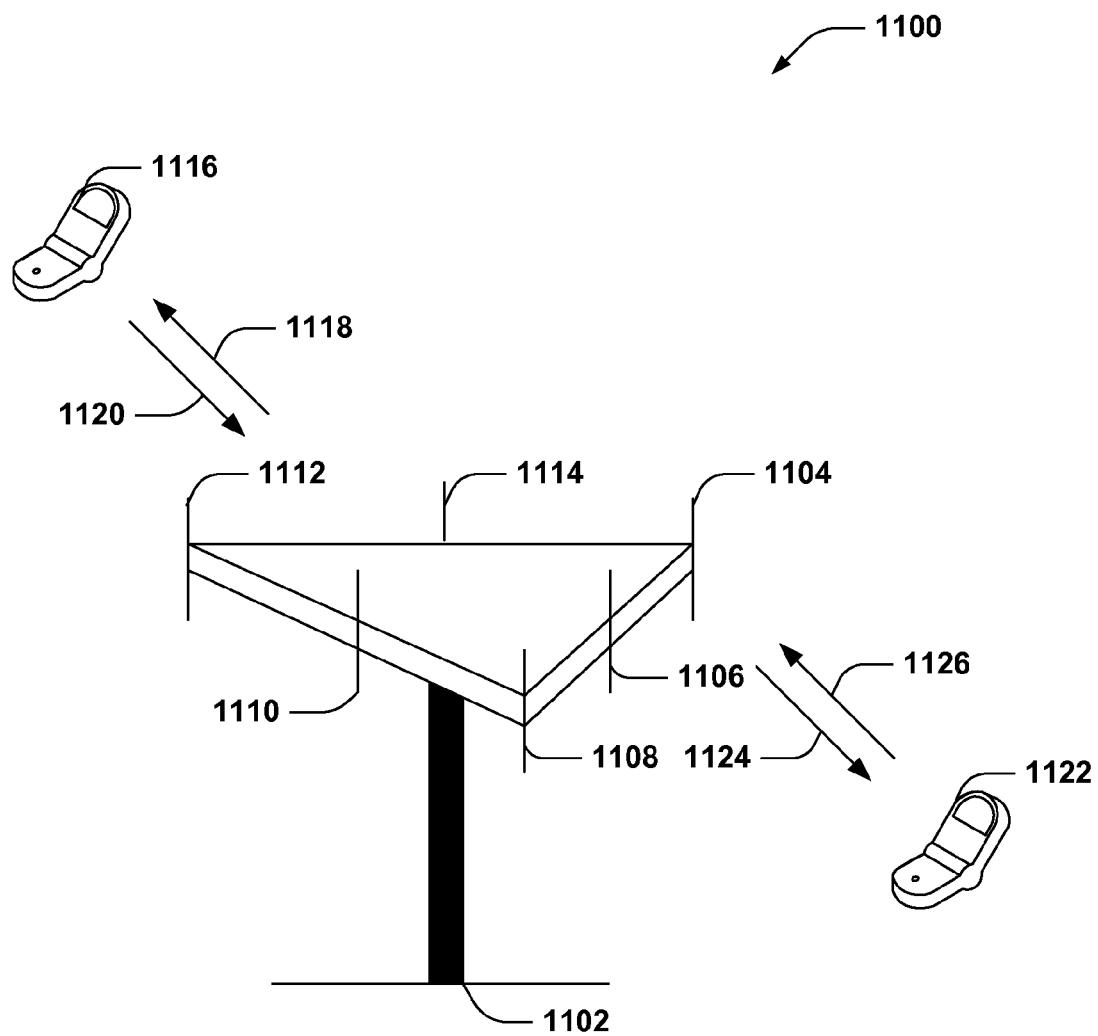
FIG. 11 is a block diagram of an example wireless communication system in accordance with various aspects set forth herein.

Referring now to FIG. 11, a wireless communication system 1100 is illustrated in accordance with various embodiments presented herein. System 1100 comprises a base station 1102 that can include multiple antenna groups. For example, one antenna group can include antennas 1104 and 1106, another group can comprise antennas 1108 and 1110, and an additional group can include antennas 1112 and 1114. Two antennas are illustrated for each antenna group; however, more or fewer antennas can be utilized for each group. Base station 1102 can additionally include a transmitter chain and a receiver chain, each of which can in turn comprise a plurality of components associated with signal transmission and reception (e.g., processors, modulators, multiplexers, demodulators, demultiplexers, antennas, etc.), as is appreciated.

Base station 1102 can communicate with one or more mobile devices such as mobile device 1116 and mobile device 1122; however, it is to be appreciated that base station 1102 can communicate with substantially any number of mobile devices similar to mobile devices 1116 and 1122. Mobile devices 1116 and 1122 can be, for example, cellular phones, smart phones, laptops, handheld communication devices, handheld computing devices, satellite radios, global positioning systems, PDAs, and/or any other suitable device for communicating over wireless communication system 1100. As depicted, mobile device 1116 is in communication with antennas 1112 and 1114, where antennas 1112 and 1114 transmit information to mobile device 1116 over a forward link 1118 and receive information from mobile device 1116 over a reverse link 1120. Moreover, mobile device 1122 is in communication with antennas 1104 and 1106, where antennas 1104 and 1106 transmit information to mobile device 1122 over a forward link 1124 and receive information from mobile device 1122 over a reverse link 1126. In a frequency division duplex (FDD) system, forward link 1118 can utilize a different frequency band than that used by reverse link 1120, and forward link 1124 can employ a different frequency band than that employed by reverse link 1126, for example. Further, in a time division duplex (TDD) system, forward link 1118 and reverse link 1120 can utilize a common frequency band and forward link 1124 and reverse link 1126 can utilize a common frequency band.

Each group of antennas and/or the area in which they are designated to communicate can be referred to as a sector of base station 1102. For example, antenna groups can be designed to communicate to mobile devices in a sector of the areas covered by base station 1102. In communication over forward links 1118 and 1124, the transmitting antennas of base station 1102 can utilize beamforming to improve signal-to-noise ratio of forward links 1118 and 1124 for mobile devices 1116 and 1122. Also, while base station 1102 utilizes beamforming to transmit to mobile devices 1116 and 1122 scattered randomly through an associated coverage, mobile devices in neighboring cells can be subject to less interference as compared to a base station transmitting through a single antenna to all its mobile devices. Moreover, mobile devices 1116 and 1122 can communicate directly with one another using a peer-to-peer or ad hoc technology as depicted. According to an example, system 1100 can be a multiple-input multiple-output (MIMO) communication system.

Figure 12:
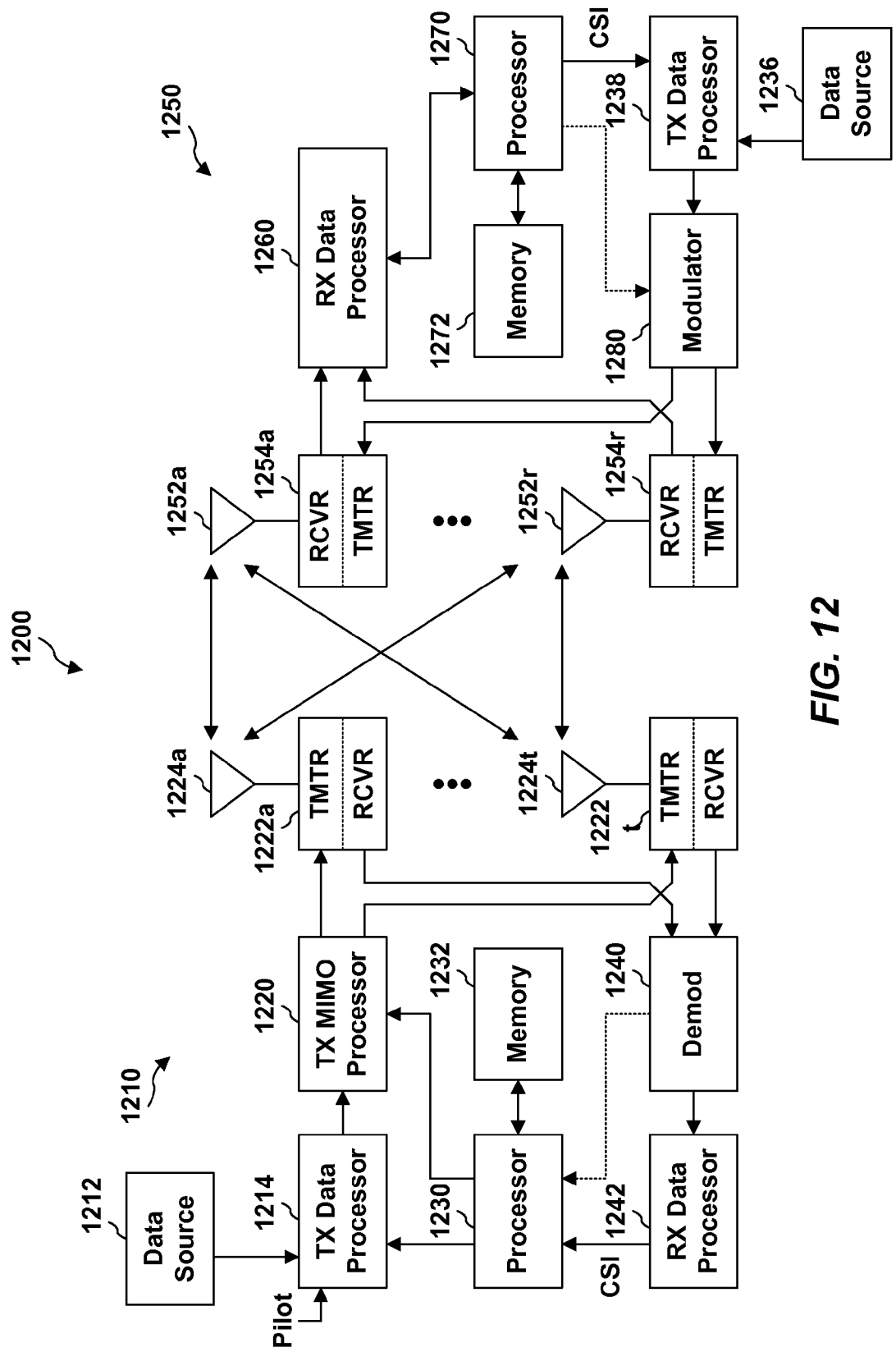
FIG. 12 is an illustration of an example wireless network environment that can be employed in conjunction with the various systems and methods described herein.

FIG. 12 shows an example wireless communication system 1200. The wireless communication system 1200 depicts one base station 1210 and one mobile device 1250 for sake of brevity. However, it is to be appreciated that system 1200 can include more than one base station and/or more than one mobile device, wherein additional base stations and/or mobile devices can be substantially similar or different from example base station 1210 and mobile device 1250 described below. In addition, it is to be appreciated that base station 1210 and/or mobile device 1250 can employ the systems (FIGS. 1, 2, and 8-11), methods (FIGS. 3-5), mobile devices (FIG. 6), and/or computer devices, (FIG. 7) described herein to facilitate wireless communication there between. For example, components or functions of the systems and/or methods described herein can be part of a memory 1232 and/or 1272 or processors 1230 and/or 1270 described below, and/or can be executed by processors 1230 and/or 1270 to perform the disclosed functions.

At base station 1210, traffic data for a number of data streams is provided from a data source 1212 to a transmit (TX) data processor 1214. According to an example, each data stream can be transmitted over a respective antenna. TX data processor 1214 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 1250 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 1230.

The modulation symbols for the data streams can be provided to a TX MIMO processor 1220, which can further process the modulation symbols (e.g., for OFDM). TX MIMO processor 1220 then provides $N_T$ modulation symbol streams to $N_T$ transmitters (TMTR) 1222a through 1222t. In various embodiments, TX MIMO processor 1220 applies beamforming weights to the symbols of the data streams and to the antenna from which the symbol is being transmitted.

Each transmitter 1222 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 1222a through 1222t are transmitted from $N_T$ antennas 1224a through 1224t, respectively.

At mobile device 1250, the transmitted modulated signals are received by $N_R$ antennas 1252a through 1252r and the received signal from each antenna 1252 is provided to a respective receiver (RCVR) 1254a through 1254r. Each receiver 1254 conditions (e.g., filters, amplifies, and downconverts) a respective signal, digitizes the conditioned signal to provide samples, and further processes the samples to provide a corresponding "received" symbol stream.

An RX data processor 1260 can receive and process the $N_R$ received symbol streams from $N_R$ receivers 1254 based on a particular receiver processing technique to provide $N_T$ "detected" symbol streams. RX data processor 1260 can demodulate, deinterleave, and decode each detected symbol stream to recover the traffic data for the data stream. The processing by RX data processor 1260 is complementary to that performed by TX MIMO processor 1220 and TX data processor 1214 at base station 1210.

The reverse link message can comprise various types of information regarding the communication link and/or the received data stream. The reverse link message can be processed by a TX data processor 1238, which also receives traffic data for a number of data streams from a data source 1236, modulated by a modulator 1280, conditioned by transmitters 1254a through 1254r, and transmitted back to base station 1210.

At base station 1210, the modulated signals from mobile device 1250 are received by antennas 1224, conditioned by receivers 1222, demodulated by a demodulator 1240, and processed by a RX data processor 1242 to extract the reverse link message transmitted by mobile device 1250. Further, processor 1230 can process the extracted message to determine which precoding matrix to use for determining the beamforming weights.

Processors 1230 and 1270 can direct (e.g., control, coordinate, manage, etc.) operation at base station 1210 and mobile device 1250, respectively. Respective processors 1230 and 1270 can be associated with memory 1232 and 1272 that store program codes and data. Processors 1230 and 1270 can also perform computations to derive frequency and impulse response estimates for the uplink and downlink, respectively.

Figure 13:
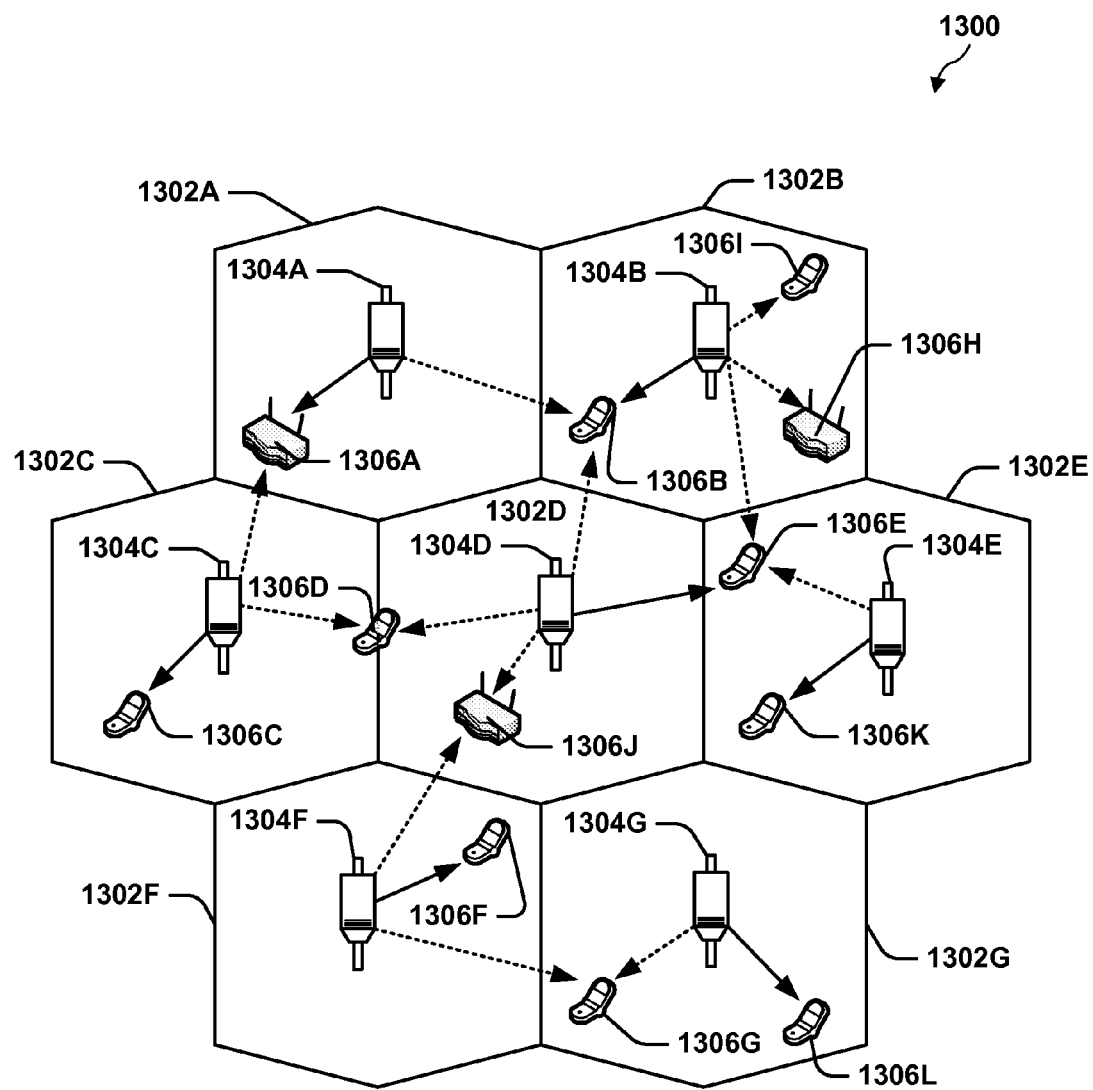
FIG. 13 illustrates an example wireless communication system, configured to support a number of devices, in which the aspects herein can be implemented.

FIG. 13 illustrates a wireless communication system 1300, configured to support a number of users, in which the teachings herein may be implemented. The system 1300 provides communication for multiple cells 1302, such as, for example, macro cells 1302A-1302G, with each cell being serviced by a corresponding access node 1304 (e.g., access nodes 1304A-1304G). As shown in FIG. 13, access terminals 1306 (e.g., access terminals 1306A-1306L) can be dispersed at various locations throughout the system over time. Each access terminal 1306 can communicate with one or more access nodes 1304 on a forward link (FL) and/or a reverse link (RL) at a given moment, depending upon whether the access terminal 1306 is active and whether it is in soft handoff, for example. The wireless communication system 1300 can provide service over a large geographic region.

Figure 14:
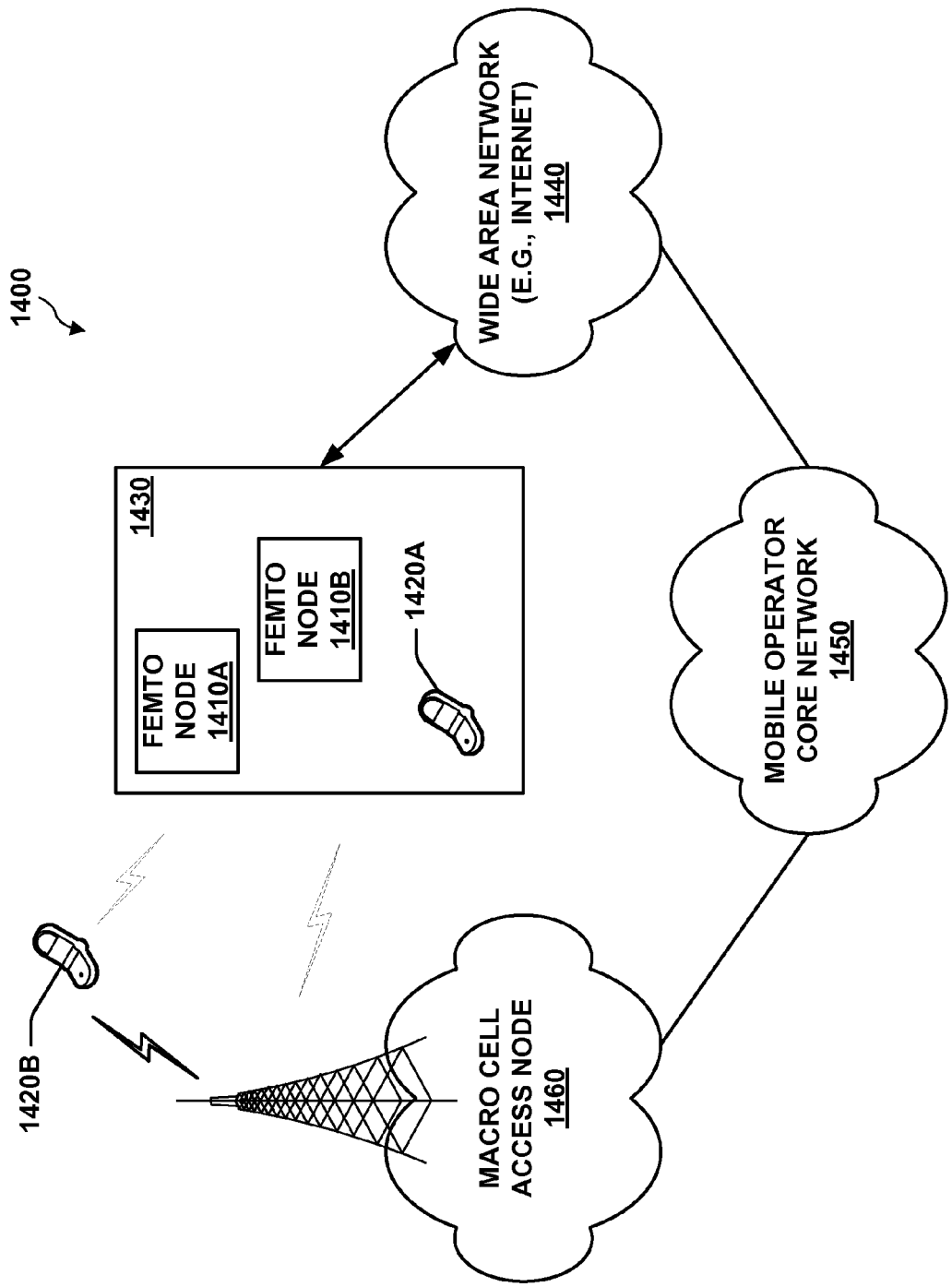
FIG. 14 is an illustration of an exemplary communication system to enable deployment of femtocells within a network environment.

FIG. 14 illustrates an exemplary communication system 1400 where one or more femto nodes are deployed within a network environment. Specifically, the system 1400 includes multiple femto nodes 1410A and 1410B (e.g., femtocell nodes or H(e)NB) installed in a relatively small scale network environment (e.g., in one or more user residences 1430). Each femto node 1410 can be coupled to a wide area network 1440 (e.g., the Internet) and a mobile operator core network 1450 via a digital subscriber line (DSL) router, a cable modem, a wireless link, or other connectivity means (not shown). As will be discussed below, each femto node 1410 can be configured to serve associated access terminals 1420 (e.g., access terminal 1420A) and, optionally, alien access terminals 1420 (e.g., access terminal 1420B). In other words, access to femto nodes 1410 can be restricted such that a given access terminal 1420 can be served by a set of designated (e.g., home) femto node(s) 1410 but may not be served by any non-designated femto nodes 1410 (e.g., a neighbor's femto node).

Figure 15:
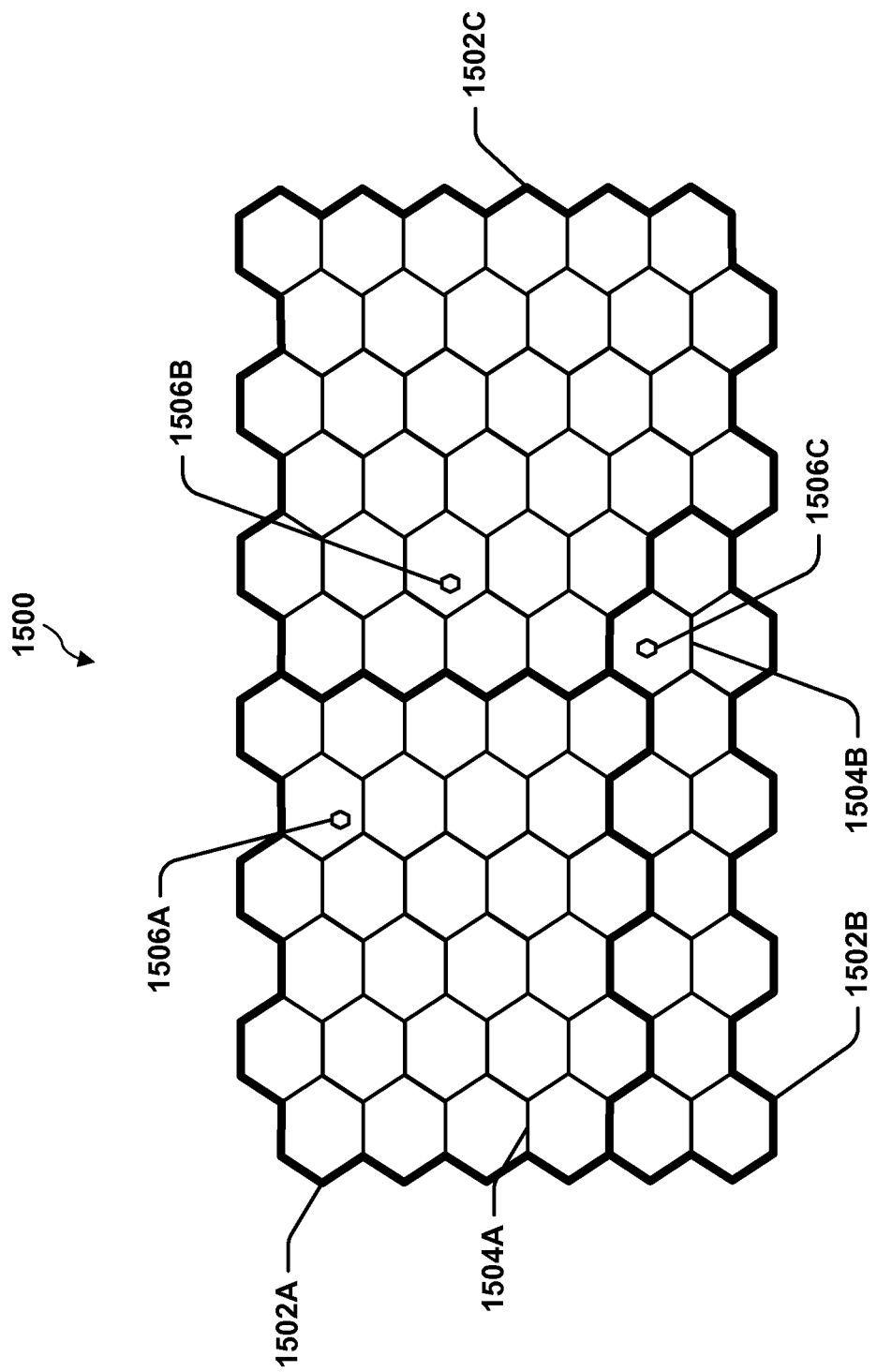
FIG. 15 illustrates an example of a coverage map having several defined tracking areas.

FIG. 15 illustrates an example of a coverage map 1500 where several tracking areas 1502 (or routing areas or location areas) are defined, each of which includes several macro coverage areas 1504. Here, areas of coverage associated with tracking areas 1502A, 1502B, and 1502C are delineated by the wide lines and the macro coverage areas 1504 are represented by the hexagons. The tracking areas 1502 also include femto coverage areas 1506. In this example, each of the femto coverage areas 1506 (e.g., femto coverage area 1506C) is depicted within a macro coverage area 1504 (e.g., macro coverage area 1504B). It should be appreciated, however, that a femto coverage area 1506 may not lie entirely within a macro coverage area 1504. In practice, a large number of femto coverage areas 1506 can be defined with a given tracking area 1502 or macro coverage area 1504. Also, one or more pico coverage areas (not shown) can be defined within a given tracking area 1502 or macro coverage area 1504.

Referring again to FIG. 14, the owner of a femto node 1410 can subscribe to mobile service, such as, for example, 3G mobile service, offered through the mobile operator core network 1450. In addition, an access terminal 1420 can be capable of operating both in macro environments and in smaller scale (e.g., residential) network environments. Thus, for example, depending on the current location of the access terminal 1420, the access terminal 1420 can be served by an access node 1460 or by any one of a set of femto nodes 1410 (e.g., the femto nodes 1410A and 1410B that reside within a corresponding user residence 1430). For example, when a subscriber is outside his home, he is served by a standard macro cell access node (e.g., node 1460) and when the subscriber is at home, he is served by a femto node (e.g., node 1410A). Here, it should be appreciated that a femto node 1410 can be backward compatible with existing access terminals 1420.

A femto node 1410 can be deployed on a single frequency or, in the alternative, on multiple frequencies. Depending on the particular configuration, the single frequency or one or more of the multiple frequencies can overlap with one or more frequencies used by a macro cell access node (e.g., node 1460). In some aspects, an access terminal 1420 can be configured to connect to a preferred femto node (e.g., the home femto node of the access terminal 1420) whenever such connectivity is possible. For example, whenever the access terminal 1420 is within the user's residence 1430, it can communicate with the home femto node 1410.

In some aspects, if the access terminal 1420 operates within the mobile operator core network 1450 but is not residing on its most preferred network (e.g., as defined in a preferred roaming list), the access terminal 1420 can continue to search for the most preferred network (e.g., femto node 1410) using a Better System Reselection (BSR), which can involve a periodic scanning of available systems to determine whether better systems are currently available, and subsequent efforts to associate with such preferred systems. Using an acquisition table entry (e.g., in a preferred roaming list), in one example, the access terminal 1420 can limit the search for specific band and channel. For example, the search for the most preferred system can be repeated periodically. Upon discovery of a preferred femto node, such as femto node 1410, the access terminal 1420 selects the femto node 1410 for camping within its coverage area.

A femto node can be restricted in some aspects. For example, a given femto node can only provide certain services to certain access terminals. In deployments with so-called restricted (or closed) association, a given access terminal can only be served by the macro cell mobile network and a defined set of femto nodes (e.g., the femto nodes 1410 that reside within the corresponding user residence 1430). In some implementations, a femto node can be restricted to not provide, for at least one access terminal, at least one of: signaling, data access, registration, paging, or service.

In some aspects, a restricted femto node (which can also be referred to as a Closed Subscriber Group H(e)NB) is one that provides service to a restricted provisioned set of access terminals. This set can be temporarily or permanently extended as necessary. In some aspects, a Closed Subscriber Group (CSG) can be defined as the set of access nodes (e.g., femto nodes) that share a common access control list of access terminals. A channel on which all femto nodes (or all restricted femto nodes) in a region operate can be referred to as a femto channel.

Various relationships can thus exist between a given femto node and a given access terminal. For example, from the perspective of an access terminal, an open femto node can refer to a femto node with no restricted association. A restricted femto node can refer to a femto node that is restricted in some manner (e.g., restricted for association and/or registration). A home femto node can refer to a femto node on which the access terminal is authorized to access and operate on. A guest femto node can refer to a femto node on which an access terminal is temporarily authorized to access or operate on. An alien femto node can refer to a femto node on which the access terminal is not authorized to access or operate on, except for perhaps emergency situations (e.g., 911 calls).

From a restricted femto node perspective, a home access terminal can refer to an access terminal that authorized to access the restricted femto node. A guest access terminal can refer to an access terminal with temporary access to the restricted femto node. An alien access terminal can refer to an access terminal that does not have permission to access the restricted femto node, except for perhaps emergency situations, for example, 911 calls (e.g., an access terminal that does not have the credentials or permission to register with the restricted femto node).

For convenience, the disclosure herein describes various functionality in the context of a femto node. It should be appreciated, however, that a pico node can provide the same or similar functionality as a femto node, but for a larger coverage area. For example, a pico node can be restricted, a home pico node can be defined for a given access terminal, and so on.

A wireless multiple-access communication system can simultaneously support communication for multiple wireless access terminals. As mentioned above, each terminal can communicate with one or more base stations via transmissions on the forward and reverse links. The forward link (or downlink) refers to the communication link from the base stations to the terminals, and the reverse link (or uplink) refers to the communication link from the terminals to the base stations. This communication link can be established via a single-in-single-out system, a MIMO system, or some other type of system.

The various illustrative logics, logical blocks, modules, components, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal.

In one or more aspects, the functions, methods, or algorithms described may be implemented in hardware, software, firmware, or any combination thereof. If implemented in software, the functions may be stored or transmitted as one or more instructions or code on a computer-readable medium, which may be incorporated into a computer program product. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, substantially any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method for utilizing packet data network (PDN) connectivity in a wireless network, comprising:
   receiving, at a user equipment (UE) from a home network of the UE, one or more parameters specifying whether PDN connectivity to a local gateway is allowed for the UE at one or more access points, wherein the one or more parameters are received at the UE based on subscription information specific to the UE;
   receiving a request to establish a PDN connection to the local gateway while connected to at least one of the one or more access points; and
   determining, at the UE, whether to initiate the PDN connection to the local gateway using the at least one of the one or more access points based at least in part on the one or more parameters,
   wherein the receiving the request to establish the PDN connection comprises receiving the request including an access point name (APN), wherein the one or more parameters comprise a list of APNs for use to establish PDN connectivity to the local gateway at the one or more access points for which PDN connectivity is allowed, and wherein the determining whether to initiate the PDN connection to the local gateway comprises determining whether the APN is included in the list of APNs as related to the at least one of the one or more access points.

2. The method of claim 1, further comprising transmitting a PDN connectivity request for the PDN connection to the local gateway to another one of the one or more access points, wherein the receiving the one or more parameters is in response to the PDN connectivity request.

3. The method of claim 2, wherein the one or more parameters comprise an indication that PDN connectivity to the local gateway is not allowed by a set of access points including the at least one of the one or more access points and the another one of the one or more access points, and the determining includes determining not to initiate the PDN connection.

4. The method of claim 3, wherein the set of access points correspond to access points in a same closed subscriber group.

5. The method of claim 3, wherein the set of access points correspond to access points in a same public land mobile network.

6. The method of claim 1, wherein the PDN connection corresponds to a local Internet Protocol (IP) access (LIPA) PDN connection or a selected IP traffic offload (SIPTO) connection, and the PDN connectivity to the local gateway corresponds to a LIPA PDN connectivity or a SIPTO PDN connectivity.

7. The method of claim 1, wherein the receiving the one or more parameters comprises receiving the one or more parameters as part of an open mobile alliance device management procedure.

8. The method of claim 1, further comprising removing the one or more parameters based at least in part on one or more triggers or events.

9. An apparatus for utilizing packet data network (PDN) connectivity in a wireless network, comprising:
at least one processor configured to:
obtain, at a user equipment (UE) from a home network of the UE, one or more parameters specifying whether PDN connectivity to a local gateway is allowed for the UE at one or more access points, wherein the one or more parameters are obtained at the UE based on subscription information specific to the UE;
receive a request to establish a PDN connection with the local gateway while connected to at least one of the one or more access points; and
determine, at the UE, whether to initiate the PDN connection to the local gateway using the at least one of the one or more access points based at least in part on the one or more parameters; and
a memory coupled to the at least one processor,
wherein the request to establish the PDN connection includes an access point name (APN), the one or more parameters comprise a list of APNs for the one or more access points for which PDN connectivity to the local gateway is allowed, and the at least one processor determines whether to initiate the PDN connection to the local gateway at least in part by determining whether the APN is included in the list of APNs as related to the at least one of the one or more access points.

10. The apparatus of claim 9, wherein the at least one processor is further configured to transmit a PDN connectivity request for the local gateway to another one of the one or more access points, wherein the at least one processor obtains the one or more parameters in response to the PDN connectivity request.

11. The apparatus of claim 10, wherein the one or more parameters comprise an indication that PDN connectivity to the local gateway is not allowed in a set of access points including the at least one of the one or more access points and the another one of the one or more access points, and the at least one processor determines not to initiate the PDN connection.

12. The apparatus of claim 11, wherein the set of access points correspond to access points in a same closed subscriber group or a same public land mobile network.

13. The apparatus of claim 9, wherein the PDN connection corresponds to a local Internet Protocol (IP) access (LIPA) PDN connection or a selected IP traffic offload (SIPTO) connection, and the PDN connectivity to the local gateway corresponds to a LIPA PDN connectivity or a SIPTO PDN connectivity.

14. An apparatus for utilizing packet data network (PDN) connectivity in a wireless network, comprising:
means for obtaining, at a user equipment (UE) from a home network of the UE, one or more parameters specifying whether PDN connectivity to a local gateway is allowed for the UE at one or more access points, wherein the one or more parameters are obtained at the UE based on subscription information specific to the UE;
means for receiving a request to establish a PDN connection to the local gateway while connected to at least one of the one or more access points; and
means for determining, at the UE, whether to initiate the PDN connection to the local gateway at the at least one of the one or more access points based at least in part on the one or more parameters,
wherein the request to establish the PDN connection includes an access point name (APN), the one or more parameters comprise a list of APNs for the one or more access points for which PDN connectivity to the local gateway is allowed, and the means for determining determines whether to initiate the PDN connection to the local gateway at least in part by determining whether the APN is included in the list of APNs as related to the at least one of the one or more access points.

15. The apparatus of claim 14, wherein the means for determining transmits a PDN connectivity request for the local gateway to another one of the one or more access points, wherein the means for obtaining obtains the one or more parameters in response to the PDN connectivity request.

16. The apparatus of claim 15, wherein the one or more parameters comprise an indication that PDN connectivity to the local gateway is not allowed in a set of access points including the at least one of the one or more access points and the another one of the one or more access points, and the means for determining determines not to initiate the PDN connection.

17. The apparatus of claim 16, wherein the set of access points correspond to access points in a same closed subscriber group or a same public land mobile network.

18. The apparatus of claim 14, wherein the PDN connection corresponds to a local Internet Protocol (IP) access (LIPA) PDN connection or a selected IP traffic offload (SIPTO) connection, and the PDN connectivity to the local gateway corresponds to a LIPA PDN connectivity or a SIPTO PDN connectivity.

19. A non-transitory computer-readable medium comprising code executable for utilizing packet data network (PDN) connectivity in a wireless network, the code comprising:
code for obtaining, at a user equipment (UE) from a home network of the UE, one or more parameters specifying whether PDN connectivity to a local gateway is allowed for the UE at one or more access points, wherein the one or more parameters are obtained at the UE based on subscription information specific to the UE;
code for receiving a request to establish a PDN connection to the local gateway while connected to at least one of the one or more access points; and
code for determining, at the UE, whether to initiate the PDN connection to the local gateway using the at least one of the one or more access points based at least in part on the one or more parameters,
wherein the request to establish the PDN connection includes an access point name (APN), the one or more parameters comprise a list of APNs for the one or more access points for which PDN connectivity to the local gateway is allowed, and the code for causing the at least one computer to determine determines whether to initiate the PDN connection to the local gateway at least in part by determining whether the APN is included in the list of APNs as related to the at least one of the one or more access points.

20. The computer-readable medium of claim 19, wherein the non-transitory computer-readable medium further comprises code for causing the at least one computer to transmit a PDN connectivity request for the local gateway to another one of the one or more access points, and wherein the code for causing the at least one computer to obtain obtains the one or more parameters in response to the PDN connectivity request.

21. The computer-readable medium of claim 20, wherein the one or more parameters comprise an indication that PDN connectivity for the local gateway is not allowed in a set of access points including the at least one of the one or more access points and the another one of the one or more access points, and the code for causing the at least one computer to determine determines not to initiate the PDN connection.

22. The computer-readable medium of claim 21, wherein the set of access points correspond to access points in a same closed subscriber group or a same public land mobile network.

23. The computer-readable medium of claim 19, wherein the PDN connection corresponds to a local Internet Protocol (IP) access (LIPA) PDN connection or a selected IP traffic offload (SIPTO) connection, and the PDN connectivity to the local gateway corresponds to a LIPA PDN connectivity or a SIPTO PDN connectivity.

24. An apparatus for utilizing packet data network (PDN) connectivity in a wireless network, comprising:
   at least one processor configured to execute:
      a parameter receiving component configured to obtain, at a user equipment (UE) from a home network of the UE, one or more parameters specifying whether PDN connectivity to a local gateway is allowed for the UE at one or more access points, wherein the one or more parameters are obtained at the UE based on subscription information specific to the UE;
      a PDN request determining component configured to receive a request to establish a PDN connection to the local gateway while connected to at least one of the one or more access points; and
      a PDN connection requesting component configured to determine, at the UE, whether to initiate the PDN connection to the local gateway at the at least one of the one or more access points based at least in part on the one or more parameters,
   wherein the request to establish the PDN connection includes an access point name (APN), the one or more parameters comprise a list of APNs for the one or more access points for which PDN connectivity to the local gateway is allowed, and the PDN connection requesting component determines whether to initiate the PDN connection to the local gateway at least in part by determining whether the APN is included in the list of APNs as related to the at least one of the one or more access points.

25. The apparatus of claim 24, wherein the PDN connection requesting component is further configured to transmit a PDN connectivity request for the local gateway to another one of the one or more access points, and wherein the parameter receiving component obtains the one or more parameters in response to the PDN connectivity request.

26. The apparatus of claim 25, wherein the one or more parameters comprise an indication that PDN connectivity to the local gateway is not allowed in a set of access points including the at least one of the one or more access points and the another one of the one or more access points, and the PDN connection requesting component determines not to initiate the PDN connection.

27. The apparatus of claim 26, wherein the set of access points correspond to access points in a same closed subscriber group or a same public land mobile network.

28. The apparatus of claim 24, wherein the PDN connection corresponds to a local Internet Protocol (IP) access (LIPA) PDN connection or a selected IP traffic offload (SIPTO) connection, and the PDN connectivity to the local gateway corresponds to a LIPA PDN connectivity or a SIPTO PDN connectivity.

29. The apparatus of claim 24, wherein the parameter receiving component obtains the one or more parameters as part of an open mobile alliance device management procedure.

30. The apparatus of claim 24, wherein the PDN connection requesting component removes the one or more parameters based at least in part on one or more triggers or events.

* * * * *